(12) United States Patent
Whitesell et al.

(10) Patent No.: US 11,861,740 B2
(45) Date of Patent: Jan. 2, 2024

(54) SECURELY AND EFFICIENTLY TARGETING, COMMUNICATING AND MONITORING UTILITY USAGE

(71) Applicant: Radian Technical Marketing, Inc., Park City, UT (US)

(72) Inventors: Stephen Edward Whitesell, Park City, UT (US); Peter Woodruff Mayer, Boulder, CO (US); Jason Allan Craig, Logan, UT (US); Daniel Domenikus Schimpfoessl, Olathe, KS (US)

(*) Notice: Subject to any disclaimer, the term of this patent is extended or adjusted under 35 U.S.C. 154(b) by 281 days.

(21) Appl. No.: 17/351,979

(22) Filed: Jun. 18, 2021

(65) Prior Publication Data

US 2021/0383487 A1 Dec. 9, 2021

Related U.S. Application Data

(60) Provisional application No. 62/704,646, filed on May 19, 2020.

(51) Int. Cl.
*G06Q 30/02* (2023.01)
*G06Q 50/06* (2012.01)
(Continued)

(52) U.S. Cl.
CPC ......... *G06Q 50/06* (2013.01); *G06F 21/6254* (2013.01); *G06Q 30/016* (2013.01);
(Continued)

(58) Field of Classification Search
CPC ...... G06Q 30/02; G06Q 50/06; G06Q 30/016; G06Q 30/018; G06Q 30/0211;
(Continued)

(56) References Cited

U.S. PATENT DOCUMENTS

| 11,080,423 | B1 * | 8/2021 | Kassam-Adams | ..... G16H 15/00 |
| 2010/0042453 | A1 * | 2/2010 | Scaramellino | ......... G06Q 10/06 |
| | | | | 705/308 |

(Continued)

FOREIGN PATENT DOCUMENTS

| CN | 105190674 A | * 12/2015 | ............. G06Q 50/06 |
| EP | 1242932 A1 | * 9/2002 | ............... G01D 4/00 |

(Continued)

OTHER PUBLICATIONS

Hossam A. Gabbar, Energy Conservation in Residential, Commercial, and Industrial Facilities (English), Wiley-IEEE Press 2018 (Edition: 1, p. 352), 1-Jan. 2018 (Year: 2018).*

(Continued)

*Primary Examiner* — Marilyn G Macasiano
(74) *Attorney, Agent, or Firm* — Shapiro IP Law; Joseph Shapiro

(57) ABSTRACT

Example embodiments provide for a utility conservation system, whereby utility efficiency targets (i.e., the setting of one or more resource consumption threshold values—e.g., high, medium, or low resources user) may be compared to help find specific utility users (e.g., high users) by sector or other classification (e.g., hotels, with 30 or more rooms, swimming pool, etc.). In other words, example embodiments may use an industry standard classification system (e.g., the North American Industry Classification System (NAICS)) for analyzing and comparing utility customers' consumption across similar industry classes (e.g., Restaurants).

13 Claims, 26 Drawing Sheets

(51) Int. Cl.
*G06F 21/62* (2013.01)
*G06Q 30/018* (2023.01)
*G06Q 50/26* (2012.01)
*G06Q 30/016* (2023.01)
*G06Q 30/0211* (2023.01)
*G06Q 30/0234* (2023.01)

(52) U.S. Cl.
CPC ....... *G06Q 30/018* (2013.01); *G06Q 30/0211* (2013.01); *G06Q 30/0234* (2013.01); *G06Q 50/265* (2013.01)

(58) Field of Classification Search
CPC ............. G06Q 30/0234; G06Q 50/265; G06Q 30/0254; G06Q 10/067; G06Q 30/0246; G06Q 30/0207; G06F 21/6254
See application file for complete search history.

(56) References Cited

U.S. PATENT DOCUMENTS

2012/0089410 A1* 4/2012 Mikurak ................ G06Q 10/00
705/1.1
2015/0161233 A1* 6/2015 Flora ..................... G06F 16/285
707/737

FOREIGN PATENT DOCUMENTS

KR 2020-0084884 A * 7/2020 ............. G06Q 50/10
WO WO 2019/092146 A1 * 5/2019 ............. G06Q 50/10

OTHER PUBLICATIONS

Anandasivam, A., Neumann, D., Managing Revenue in Grids (English), 2009 42nd Hawaii International Conference on System Sciences (pp. 1-10), Jan. 1, 2009 (Year: 2009).*
Hossam A. Gabbar, Energy Conservation in Residential, Commercial, and Industrial Facilities (English), Wiley-IEEE Press 2018 (Edition: 1, p. 352), Jan. 1, 2018 (Year: 2018).*
W. G. Bentley; John C. Evelyn, Customer Thermal Energy Storage a Markeing Opportunity for Cooling off Electric Peak Demand (English), IEEE Transactions on Power Systems (vol. 1, Issue: 4, pp. 57-61), Nov. 1, 1986 (Year: 1986).*

* cited by examiner

Query Results

Showing 10 of 21 results 1 2 3 »

| Service ID | Address | Customer | Owner | Status | PUBS Type | NAICS Code |
|---|---|---|---|---|---|---|
| 81091 | 1425 W Fake<br>Salt Lake City, UT 84105 | Crystal Waters<br>321 S 100 E 3B<br>Salt Lake City, UT 84401 | | In Service | Restaurant | 722511<br>Full-Service Restaurants |
| 130043 | 44 Fake Blvd.<br>Salt Lake County, UT 84117 | | | In Service | Restaurant | 722514<br>Cafeterias, Grill Buffets and Buffets |
| 203331 | 2671 W Example Ln.<br>Salt Lake City, UT 84108 | John Doe<br>1024 E Skyline Wy<br>Salt Lake City, UT 84401 | | In Service | Restaurant | 7225<br>Restaurants and Other Eating Places |
| 253123 | 5523 S Example Ln. 54<br>Salt Lake City, UT 84105 | | | In Service | Restaurant | 722513<br>Limited-Service Restaurants |
| 292248 | 4172<br>Salt Lake County, UT 84117 | | | In Service | Restaurant | 722515<br>Snack and Nonalcoholic Beverage Bars |
| 310894 | 3459 W Test Ln.<br>Salt Lake City, UT 84102 | Some Test<br>40 N Somewhere St<br>Salt Lake City, UT 84401 | | In Service | Restaurant | 722511<br>Full-Service Restaurants |
| 337920 | 507 Test St.<br>Salt Lake City, UT 84106 | | | In Service | Restaurant | 7225<br>Restaurants and Other Eating Places |
| 396551 | 614 W Example Ave.<br>Salt Lake City, UT 84109 | | | In Service | Restaurant | 722<br>Food Services and Drinking Places |
| 472331 | 4572 N Fake Ave.<br>Salt Lake City, UT 84110 | | | In Service | Restaurant | 722514<br>Cafeterias, Grill Buffets and Buffets |
| 678913 | 9010 Test Blvd.<br>Salt Lake City, UT 84105 | | | In Service | Restaurant | 722515<br>Snack and Nonalcoholic Beverage Bars |

1 2 3 »

*General Service Information* — 220

High Utility Use Alerts and Conservation Programs Communication

Proposed

| 1150 | Quantity | Per unit Investment | Rebate | Investment per Measure | Annual Savings (gallons) | Annual Savings ($) | Payback (yrs) |
|---|---|---|---|---|---|---|---|
| Standard Tank Toilet Rebuilds - 1.6gps, 2" Flapper | 12 | $75.81 | | $909.69 | 170,086 | $1,307.85 | 0.7 |
| Urinal - Urinal Flush Valve Rebuild, 0.5gpf | 4 | $77.89 | | $311.56 | 41,436 | $318.65 | 1.0 |
| Faucet aerator installation - Lavatory, Neoperl PCA 0.5gpm | 12 | $12.29 | | $147.43 | 127,500 | $980.47 | 0.2 |
| DHW Energy Savings | | | | | | $460.65 | |
| Project Subtotal | | | $0 | $1,368.68 | 339,023 | $3,067.72 | 0.4 |
| Site Assessment Fee | | 0.0% | | $0.00 | | | |
| Shelf Stock | | 0.0% | | $0.00 | | | |
| Sales & Use Tax | | 6.9% | | $41.25 | | | |
| Project Grand Total | | | | $1,409.93 | 339,023 | $3,067.72 | 0.5 |
| Project Grand Total with Potential Rebates Applied | | | | $1,409.93 | 339,023 | $3,067.72 | 0.5 |

Estimated Annual Savings (% of total property-wide water use): 21%

FIG. 11b

SECURELY AND EFFICIENTLY TARGETING, COMMUNICATING AND MONITORING UTILITY USAGE

CROSS-REFERENCE TO RELATED APPLICATIONS

This United States Utility Patent Application claims priority to, along with all the rights and benefits of, Provisional Patent Application No. 62/704,646 entitled SECURELY AND EFFICIENTLY TARGETING, COMMUNICATING AND MONITORING UTILITY USAGE, with a filing date of the May, 9, 2020, the contents of which are incorporated herein by reference in their entirety.

BACKGROUND

World population has been rising continuously since the end of the Black Death, around the year 1350. Population began growing rapidly in the Western world during the industrial revolution. The most significant increase in the world's population has been since the 1950s, mainly due to medical advancements and increases in agricultural productivity.

Population growth alongside overconsumption is a key driver of energy and utility resource preservation and environmental concerns (such as climate change), due largely to resource-intensive human development, which exceeds planetary boundaries. To mitigate the impact of human population growth on our energy and other utility resources, utility companies and resource providers (e.g., water and power utilities or internet providers) are often tasked with the oversight and determination of how to best utilize their limited resources. This is especially true for utility companies where the resources provided are constrained due to outside, undeterminable influences—such as drought conditions for water utility, limited supply lines for electrical power companies, or limited bandwidth in densely populated areas for such things as wifi hotspots, mobile phone services, or internet providers. Generally, there are only two ways to solve such limitations: either build more infrastructures to handle higher demands; or determine ways to conserve the limited resources.

As history has shown, the brute force method of building infrastructure is costly—both in terms of time and money. Because of such high costs of expansion, these utility resources, in a sense, really are limited. In other words, there is a continuum of cyclical balance between the expansion of infrastructure and population growth, wherein one will always lag behind the other. Thus, even if the world had unlimited utility resources, there will always be a need to conserve valuable resources; and thus, utility companies always need to find better—more effective, efficient and collaborative ways of using these limited resources.

Understanding the continual need to conserve, utility companies will often utilize conservation managers to monitor and report on how their resources are being consumed. However, these same utility companies are swimming in data and overloaded IT departments struggle to supply conservation managers with the data or tools they need to fulfill their mandates. Furthermore, the needs of each conservation manager can vary widely between utilities, and even across geographical boundaries within the same utility system. For example, a conservation system for a water utility may not necessarily correlate or work with that of a power utility; and even a water conservation system that works in a warmer, dryer climate area, such as Arizona, may not work best for a water program in a cooler, humid climate area, such as Seattle.

In fact, even within the same utility and same geographical boundary, utility use from customer to customer will vary widely. For example, the water usage for a residential customer will differ greatly from that of a commercial property owner; and even further still, a hotel's utility consumption will differ greatly from that of an insurance agent's office—albeit, both are commercial usage.

To compound the problem even greater still, a myriad of unknown or unreported factors affect a utility customer's consumption. For instance, outside sources of information including climate data, weather, time of year, ecosystem data (soil type, vegetation, landscape, slope, etc.) may all effect the customer's utility consumption needs.

So, how can conservation managers properly determine what users are wasteful? Who might best benefit from an audit, conservation or rebate, program? Further, how can conservation managers properly communicate the customers' utility usage and available audit, conservation, and/or rebate programs available?

For example, utilities don't need to communicate directly with all of their customers in achieving their conservation goals. Instead, they may wish to focus on one specific set of consumers (e.g., only the biggest offenders or highest resource consumption users). While a consistent message to conserve may be useful from time-to-time, canvasing average and low utility users with audit or conservation programs is generally not cost effective—nor an efficient and effective way to communicate with utility customers.

In addition, the security of the data the utility or resource companies store is of utmost importance—especially in a world where users' personal data or personally identifiable information (PII) is at risk of being stolen and misused.

Accordingly, there exists a need for utility conservation method, system, and computer program products and tools that specifically target users relative to such things as their industry, geographical location, and amount of utility usage. Further, there exist a need to efficiently communicate determined conservation needs with customers and conservation managers, with means and tools easily customizable to the needs of any utility, in any geographical location, and where the data or information supplied for monitoring or auditing purposes can be securely manipulated and used for such purposes.

BRIEF SUMMARY

Example embodiments of the present invention overcome the above-identified deficiencies and drawbacks of typical conservation management mechanisms by providing methods, systems and computer program products for securely targeting, communicating and monitoring utility data usage.

For example, embodiments provide methods, systems and computer program products for securely and efficiently targeting, communicating and auditing or monitoring utility usage. More specifically, example embodiments receive, from a utility company, utility usage data for the utility company's customers, wherein the utility customers were chosen based on an industry-standard classification associated therewith. Next, the utility usage data for each of the customers is compared to a resource usage threshold value, which is set based on an industry-standard classification for each of the utility customers, which is further set based on a desired audit, conservation, or rebate program available to the customers. Based on the comparison, at least one of the customers that meet the utility usage threshold value is chosen for automatically sending a message regarding the identified customer's utility usage and the desired audit, conservation, or rebate program available, wherein the message is sent to a utility administrator, the identified one or more of the plurality of customers, or both.

Still other embodiments provide for communicating the efficacy of an audit, conservation programs, or rebate offers of interest. In this example, utility usage data is received for a plurality of the utility company's customers. Then, it is determined that at least one of the customers is enrolled in a specific audit, conservation program, or rebate offer; and, over a period of time after said enrollment, the system monitors the utility consumption usage of the customers. Utility consumption usage is monitored from prior to said enrollment with the monitored utility consumption usage post said enrollment. Based on the comparison, current results of enrollment in the specific, audit, conservation program, or rebate offer is reported for the customers.

Note that this Summary simply introduces a selection of concepts in a simplified form that are further described below in the Detailed Description. Accordingly, this Summary does not necessarily identify key features or essential aspects of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantageous features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIGS. 2(a)-2(e) illustrate the use of water efficiency targets tool and public industry standard classification system for efficiently targeting high water users in accordance with exemplary embodiments of the present invention:

FIGS. 5(a)-5(b) illustrate the use of an administrative portal and potential reporting structure for use in targeting specific utility usage in accordance with exemplary embodiments described herein:

FIGS. 10(a)-10(b) illustrate the use of a residential auditing tool for monitoring and auditing water usage in accordance with exemplary embodiments described herein;

FIGS. 11(a)-11(b) illustrates the use of a commercial auditing tool for monitoring and auditing water usage in accordance with exemplary embodiments described herein;

DETAILED DESCRIPTION

Figure 1:
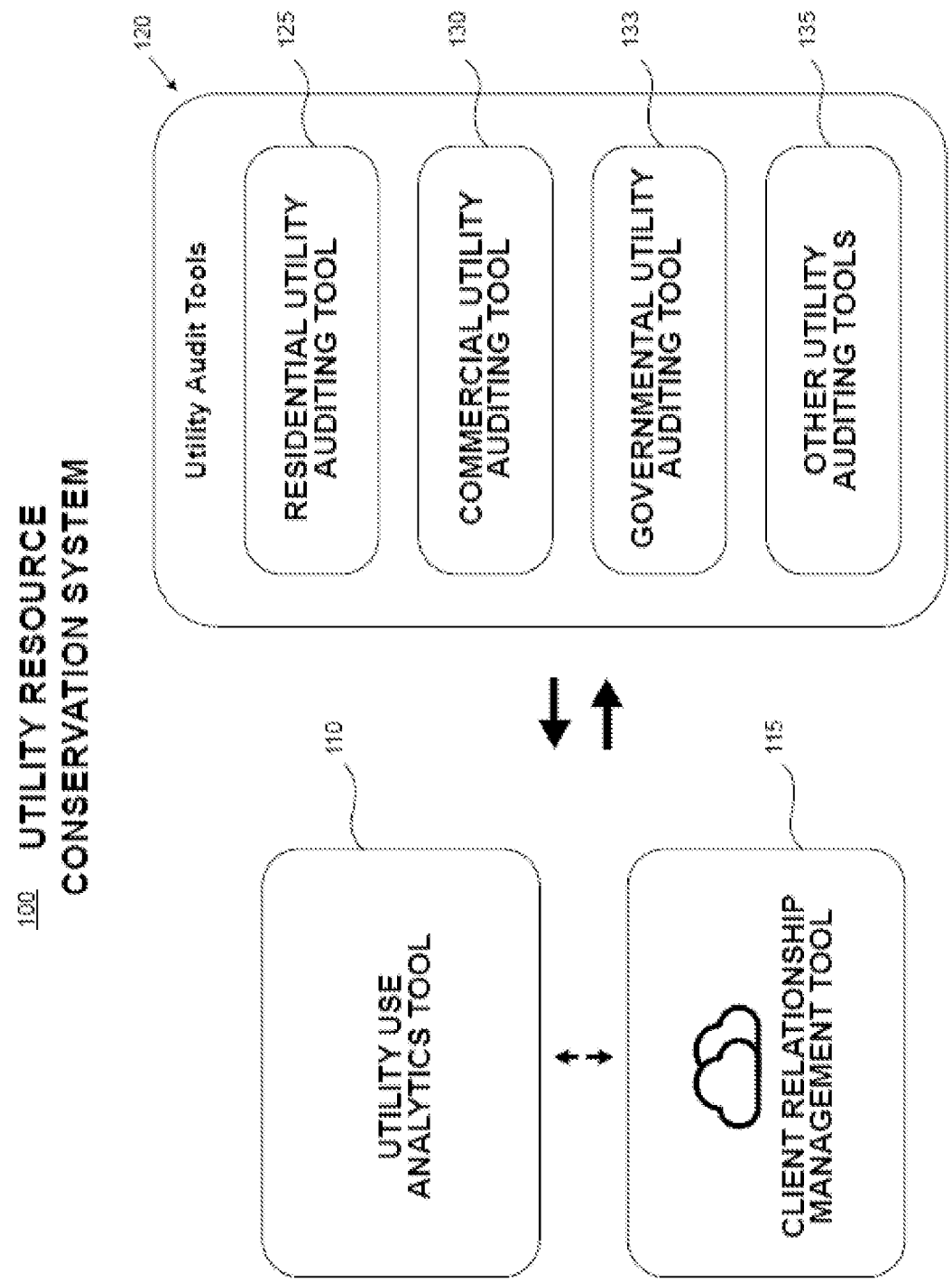
FIG. 1 illustrates an example of a water utility demand analytics, communication and water utility audit or monitoring tools in accordance with exemplary embodiments of the present invention.

The present invention extends to methods, systems, and computer program products for securely and efficiently targeting and monitoring utility resource usage and assigning conservation actions designed to save the targeted utility customer's consumption—thus, saving them money too. Further, these conservation actions themselves may also be monitored for verifying the efficacy of an audit, conservation, or rebate program.

Note that although the following described embodiments may refer to a particular type of utility company (e.g., water utility) as needing the unique, innovative utility resource conservation system described herein, one of skill in the art will recognize that exemplary embodiments herein can be utilized by any number of utility or resource providers where consumption may need monitoring and/or conserving—including: power supply companies; water utilities; internet providers; cellular phone service providers; and the like. Accordingly, the use of a specific resource (e.g., water) or a particular type of utility company (e.g., public water company) in any of the described exemplary embodiments herein is for illustrative purposes only and is not meant to limit or otherwise narrow the scope of the present invention unless otherwise explicitly claimed.

As previously mentioned, utilities may not need to communicate directly with all of their customers in achieving their conservation goals and mandates. Instead, they may wish to focus on one specific set of consumers (e.g., only the biggest offenders or highest resource consumption users).

While a consistent message to conserve may be useful from time-to-time, canvasing average and low use utility customers with audit or conservation programs is generally not cost effective—nor an efficient and effective way to communicate with utility customers.

Accordingly, exemplary embodiments employ a utility conservation system (including utility resource analytics, communications, monitoring and/or auditing tools) to help utilities or conservation managers target specific types of consumers (e.g., highest utility consumers), compared with customers across similar industry classes (e.g., the restaurant business), and/or within certain geographical locations (e.g., within a state, city, town, or other defined location). Further, example embodiments can set conservation threshold values—for determining specific types of consumers—by taking into account a myriad of different data sets from various sources and reporting agencies (e.g., weather reporting centers, satellite imaging, customer input, admin preferences, audit results, etc.). Thus, exemplary embodiments allow for dynamic or adjustable conservation threshold values, which may vary based on conservation data received internally (e.g., via: administrator input, settings, and/or preferences; input of available audits, conservation, or rebate programs; customer classification codes or settings; analytics of historical data for customer's pre and post conservation action utility resource consumption; etc.), external (e.g., via: data over the internet; user input from utility audit tools; customer settings or preferences; etc.), or both.

The utility conservation program described in other exemplary embodiments herein takes conservation actions (e.g., setting conservation program threshold values; assigning customers to an audit, conservation, or rebate program; monitoring and reporting of conservation program or action efficacy; etc.) based on historical monitoring of customer program completion and records of consumption. In other words, example embodiments monitor the progress of a customer's completion of an audit, conservation, or rebate program; wherein the system may also look at further customer consumption after implementing a recommended resource conservation action item. Thus, the efficacy of any particular resource conservation action (e.g., assigning, reporting, or otherwise communicating to the customer their utility usage and available audits, conservation, or rebate programs, etc.) may be continually evaluated for purposes of adjusting, adding, or otherwise deleting conservation programs.

Of course, as one of skilled in the art would understand, other actions and use of the conservation efficacy information are available and contemplated herein. For example, utility companies in different regions may share information for purposes of trying programs proven effective elsewhere. Accordingly, any specific use of the efficacy reporting or direct actions taken based on the monitoring of a customer's progress, completion, or implementation of an audit, conservation, or rebate program, as described herein, is used for illustrative purposes only and is not meant to limit or otherwise narrow the scope of the present invention unless otherwise explicitly claimed.

As previously mentioned, overloaded IT departments can have a hard time supplying conservation managers with the data or tools they need to fulfill their conservation mandates. Data collected from these systems allow for appropriate programs, staffing and budgeting for specific conservation goals. Accordingly, example embodiments provide for a comprehensive method, system and computer program product to help conservation managers or administrators more readily target, communicate, audit or otherwise monitor utility resource consumption for customers of specific types (e.g., highest users). In addition, example embodiments consider and provide mechanisms for ensuring the security of the data stored on behalf of the utility—thus reducing the risk that users' personal data or personally identifiable information (PII) can be inappropriately accessed or misused.

Turning now to the various Figures, e.g., as shown in FIGS. 1 and 2(a)-(e), example embodiments provide for efficiently and effectively targeting specific types of utility consumers (e.g., high utility users) based on existing public utility data that allows for filtering of customers based on an industry standard classification system; thus, allowing resource managers to develop usage thresholds values by industry class. In other words, example embodiments more accurately compare users across similar industry classes, thus, more accurately determine an average utility usage by industry; and therefore, for assigning customers to various audits, conservation, and/or rebate programs.

More specifically, as shown in FIG. 1, example embodiments provide for a utility resource conservation system 100 that includes a myriad of tools (e.g., utility use analytics tool 110, client relationship management (CRM) tool 115, and other utility audit tools 120, which can be used across varying platforms and devices; and that can be utilized or built to work independently or collaboratively. Such embodiments may be thought of as a conservation menu that administrators or resource managers may use to effectively and efficiently monitor and communicate available audit, conservation, or rebate programs to utility customers.

As shown, and as described in greater detail below, these tools may include: (1) a utility use analytics tool 110, which helps utility resource managers identify, for example, the highest utility resource users by segment or industry classification; (2) a client relationship management tool 115 (e.g., an enterprise communications portal such as Salesforce) to help resource managers, e.g., with automated communications regarding utility customers' consumption, and/or available audit, conservation, or rebate programs; and various utility audit tools 120 (e.g., a residential utility audit tool 125; a commercial utility audit tool 130; a governmental utility auditing tool 133, or any other utility auditing tool 135 as described or otherwise contemplated herein), which helps administrators or resource managers evaluate the efficacy of employing the various audit, conservation, and rebate programs available. As previously mentioned, because example embodiments contemplate that the utility resource conservation system 200 will reside both internally (i.e., with the utility company's infrastructure) and externally (e.g., from the internet or based on user reports for progress or completion of an audit, conservation, or rebate program), other example embodiments allow for data portability and cross platform communications in each tool, while ensuring the security of personal identifiable information (PII).

Note that while specific names may be associated with the above and other modules or tools as used in describing various exemplary embodiments, such naming conventions are for illustrative purposes only and that the varying embodiments can be employed with other similar tools and mechanisms. As such, any mention of a specific name, brand, or type of tool used in the utility conservation analytics, communication or auditing system described herein is for illustrative purposes only and is not meant to limit or otherwise narrow the scope of the present invention; unless, of course, otherwise explicitly claimed.

As illustrated in FIGS. 2(a)-(e); example embodiments provide for mechanisms whereby utility efficiency targets (i.e., the setting of one or more resource consumption threshold values—e.g., high, medium, or low resources user) may be compared to help find specific utility users (e.g., high users) by sector or other classification (e.g., hotels, with 30 or more rooms, swimming pool, etc.). In other words, example embodiments may use an industry standard classification system (e.g., the North American Industry Classification System (NAICS), which is commonly used in water utilities) for analyzing and comparing utility customers' consumption across similar industry classes (e.g., Restaurants), subclass (e.g., Fast Food, Restaurants), sub-subclass (e.g., Hamburger, Fast Food, Restaurants), and so on and so forth.

Note that the granularity of class definition or subclassification may vary based on any number of desired results in categorizing customers for normalization or other conservation purposes. In other words, a resource manager or utility administrator can set the class and subclass to capture utility customers of similar use standards. Further analysis of the resource usage across the defined classification then allows for the setting of industry standard threshold consumption values used in the determination of targeted conservation customers (e.g., utility consumers with utility usage of "only high"; "high and low"; "medium", etc.).

Thus, by using industry classifications to first filter customer utility usage data, example embodiments allow for comparing resource consumption for customers of the same classes. This allows for an overall averaging or normalizing of consumption usage across the specified class; thus, more accurately and efficiently defining industry standard resource consumption thresholds. More specifically, example embodiments provide that once a industry class is specified and used to define industry standard consumption thresholds, specific types of utility users within the specified industry classification (e.g. high utility users—as defined by industry standard thresholds) may then be determined and targeted with one or more resource conservation actions (e.g., automatically assigning customers to an audit, conservation, or rebate program; sending a message to the resource manager, customer, or both, which reports on the targeted customer's utility consumption, available audit, conservation or rebate programs, or other related information).

Note that although the above example embodiment used the data from the resulting industry standard classification tool or filter to set or define industry standard consumption thresholds, for specific types of utility users (e.g., low, medium, or high utility resource consumers), this value may also be set using other means for quantifying utility consumption for customers across similar industry standard classifications. For example, the value may be set based on historical data, collected, and stored by the utility conservation system described herein. Alternatively, the threshold values may be based on other data received from external sources (e.g., weather reports over the internet, user input from an audit tool, etc.) or based on collaborative feedback and accord from industry leaders. Accordingly, any specific means for determining or setting industry standard classification codes, or any specific ordering of when the industry standard classification is derived based on further actions from other conservation tools described herein, is used for exemplary illustrative purposes only and is not meant to limit or otherwise narrow the scope of the present invention; unless otherwise specifically claimed.

Figure 2A:
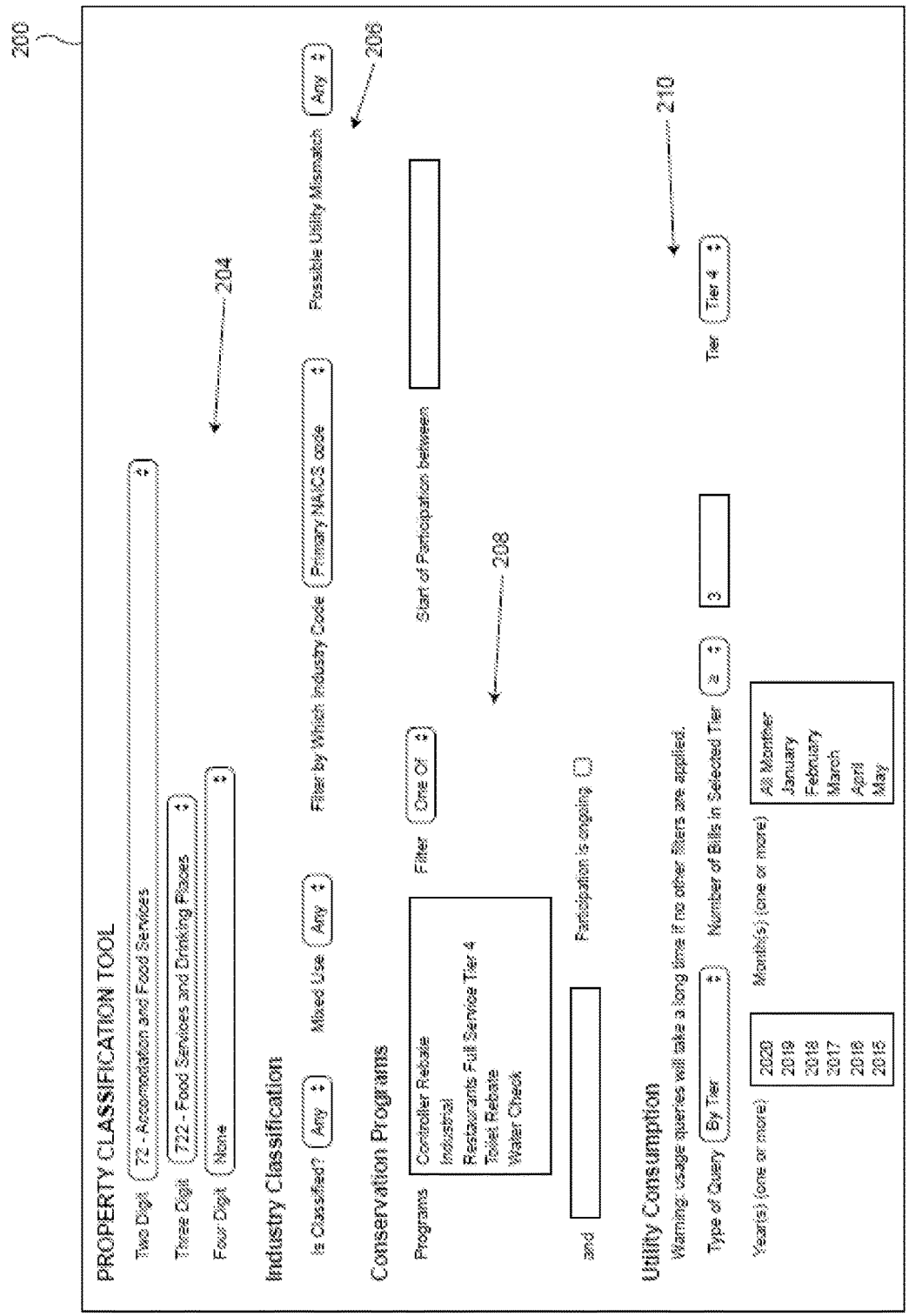

FIGS. 2(a)-2(e) illustrate the use of various resource conservation tools, used in accordance with exemplary embodiments, whereby a resource manager or other administrator may search and filter resulting customer consumption data by multiple data points to identify, for example, the customers most in need of resource conservation. For example, as shown in FIG. 2(a), a water utility manager may be presented with a utility conservation program interface 200. In such example, the administrator or resource manager may search and filter utility consumers based on choosing the various fields for the property classes 204 and setting the appropriate industry classification parameters 206. Moreover, the administrator may then set the parameters 208 for any available conservation programs and then define the type of utility customer (e.g., "high" users) targeted using the utility the consumption fields 210.

More specifically, as shown in FIG. 2(a), a resource manager for a water utility company has chosen to search and analyze utility usage for a targeted customer by setting the classification code 204 to Food Services, with a subclass of drinking places. Further, because the utility is a water company, the Primary NAICS code is set as the industry classification 206 and the available conservation programs are listed and defined by the fields 208. Next, the utility consumption parameters 210 are set such that the utility use analytics tool will search for customers in the food service industry, with 3 or more bills; in tier four (defined here as the highest user level); and in the year 2019. Of course, other industry standard classification systems other than the NAICS may be used or deployed in accordance with example embodiments described herein. Similarly, other industry classification codes or fields, conservation programs and participation parameters, and/or utility consumption usage tiers or usage definitions may be used in searching and targeting specific utility use customers in accordance with example embodiments described herein. Thus, any specific field, code, parameter, or industry standard classification as used herein is for illustrative purposes only and is not meant to limit or otherwise narrow the scope of the present invention; unless otherwise specifically claimed. Likewise, any setting or defining of specific audit, conservation, or rebate programs, or the use of any particular parameters in setting utility consumption thresholds, is used herein for illustrative purposes only and is not meant to limit or otherwise narrow the scope of the present invention; unless otherwise specifically claimed.

FIG. 2(b) shows an example of a conservation action, which may result based on the query performed in FIG. 2(a). In this example, the utility conservation system generated a report 215, which lists those water utility users that met the criteria of: (1) food service industry classification; with three (3) or more bills; in tier four water usage (defined here as the highest water usage level); and in the year 2019. The report 215 may include any number of related customer elements 220 (such as address, customer, classification type, classification code, etc.), used to further assist in communicating the conservation results to the resource manager, the customer, or both. Further, the related customer elements 220 may be used to further analyze and categorize utility customer resource usage and/or adding those customers into available audit, conservation, or rebate programs. Likewise, the resulting conservation action may communicate the customer's utility usage along with the availability of an audit, conservation, or rebate program thru, e.g., a customer relationship management portal (e.g., an enterprise portal, such as, Salesforce). Thus, the customer may automatically receive information about the utility conservation actions, get enrolled in an available audit, conservation, or rebate program, and subsequently—as described in other exemplary embodiments below—use the auditing tools to report progress in completing the assigned audit, conservation, or rebate program, which can then be used to track the efficacy of any such conservation action.

Figure 2C:
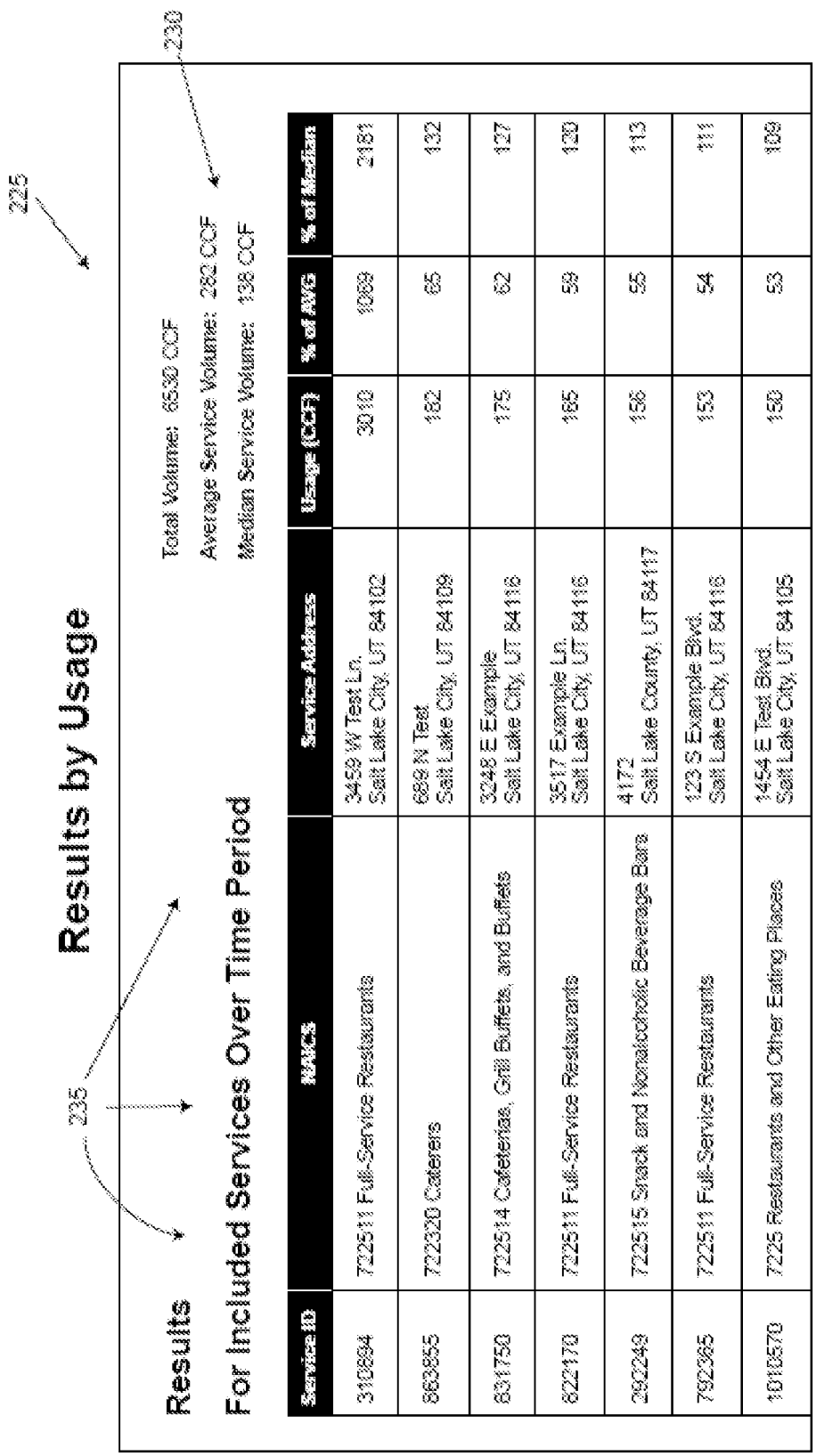

Of course, as previously mentioned, the conservation action performed may vary depending on the desired use of the resulting information. For example, FIG. 2(c) shows the result of a similar query used in FIG. 2(a); however, the query sorts customers based on highest water usage in the industry sector. More specifically, as shown in this example, the results 225 can be sorted by the usage category of highest centum cubic feet (CCF), but also showing such things as percent of average or median service usage in CCF 230; or any other customer fields 235 to assist the resource manager in assigning or otherwise communicating available audit, conservation, or rebate programs to the utility customer.

Furthermore, by allowing the resource manager to sort the resource consumption usage data based on a myriad of comparable customer usage elements, conservation administrators can more accurately define consumption threshold values for targeting specific types of utility within industry standard classes. For example, as illustrated in FIG. 2(c), the "Full-Service" Restaurant with a Service ID of 310894 has a CCF usage value of 3010, which is well outside the average and median utility consumption usage for this industry class. Thus, the resource manager or utility analytics tool may identify such customer usage as "abnormally" or "excessively" high—excluding it from the calculation in the industry standard resource consumption threshold value, which will more accurately reflect the actual average and median utility resource consumption based within that sector.

Of course, there are other benefits to example embodiments that enable targeted communications about auditing, conservation, or rebate program tools to specific types of utility consumers (e.g., highest users, in the last six months, etc.) within the same industry class (e.g., restaurants, with bars, etc.). For example, because customers receive target specific communications from the utility—rather than continually receiving irrelevant or unnecessary communications about all conservation programs; or likewise, requiring the customer to filter thru a "laundry list" of all available programs across all industry sectors, hoping to find one that s/he qualifies for—they're more likely to pay attention to the conservation message and make informed decisions about their conservation habits. Further, because the evaluation of utility consumption is measured based on industry standard classifications, the customer will find the conservation or consumption analysis highly reliable; and thus, being more compelled or motivated to use the available conservation programs—especially knowing their competitors (i.e., likely those using a similar or the same industry standard classification code) are using less utility resources; and thus, saving on their own bottom lines.

Figure 2D:
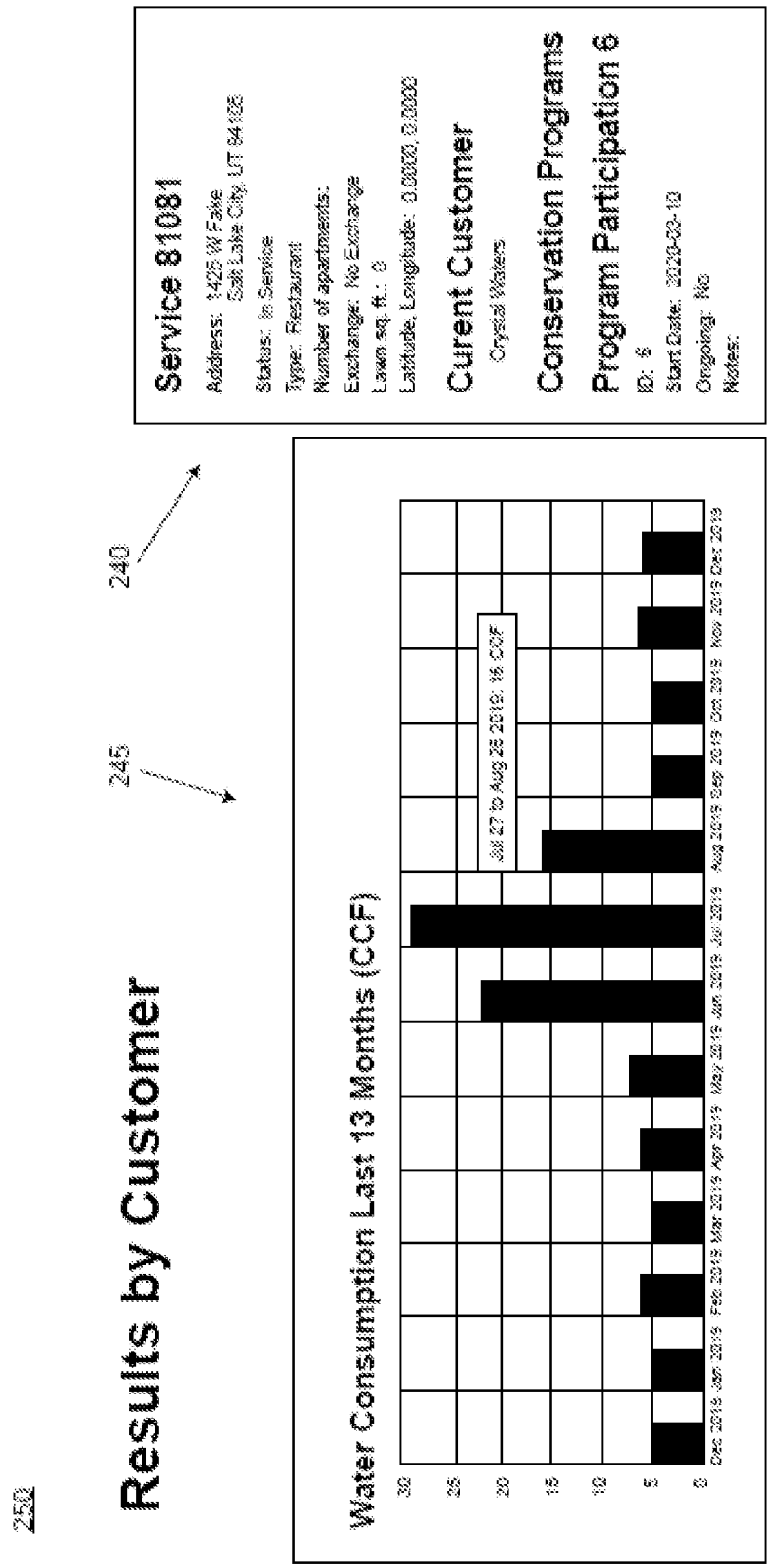

Of course, as mentioned before, the resulting conservation report may be further evaluated by narrowing the scope of the customer fields used in the conservation query. For example, FIG. 2(d) illustrates the conservation query results of FIG. 2(a), with the added granularity of filtering down to the service ID level. The conservation action may then be a report showing utility usage data for a specific customer (i.e., the customer with the set service ID level—in this instance, Service ID 81081, over a specific period of time (as shown in this example, a utility use analytics tool or a resource manager can evaluate utility usage data for customer with Service ID 81081, over a thirteen (13) month period) in order to identify outlying trends or other evidence that might explain the utility consumption irregularity. For instance, as noted in the utility conservation result 250 of FIG. 2(d), the bar graph 245 for the water consumption of the targeted water utility customer (further identified by the customer usage information 240) shows a discrepancy in the targeted customer's consumption over the summer months of the year 2019 (i.e., June, July and August). As such, the analytics tool or resource manager may inquire further and learn that a water leak was found in these months, which was subsequently repaired. Otherwise, the utility conservation system or utility administrator may find that this customer is in an unusually warmer climate than other customers of the similar class; thus, using more water over the summer months than its industry classmates.

Of course, the utility conservation analytics tool or conservation managers can utilize and sort the customer usage data in a myriad of different forms or resulting formats (a report via an administrative tool or application program interface for the utility conservation system; a message sent to the customer reporting their utility usage and/or assigning them to a conservation rebate program intended to help customers stay away from high water usage threshold values (in this instance, the program would assist in keeping them out of tier 4, wherein tier 4 is the maximum usage level set by this particular water utility). Of course, other utilities may have varying levels of resource usage thresholds (set based on industry standard classifications for customers across similar industry classes), which may also result in any number of conservation actions. For example, a resource manager may want to reward utility users that improve their utility consumption over a period of time. Similarly, the analytics tool may be set for identifying "low" utility consumers, which it then automatically signs them up for a rebate program.

Alternatively, or in conjunction, the result may be a report that shows trending utility consumption for a "low" utility usage customer and may produce a pie chart, bar graph, or other visual representation of the customer utility usage for explaining abnormal or irregular low utility usage. For example, the utility manager may find that the company went out of business, however, they failed to turn off the utility service, which explains their current trend of being a low utility resource user. Accordingly, any specific utility usage threshold value or consumption level as used herein for determining any specific type of conservation result is made by way of illustration only and is not meant to limit or otherwise narrow the scope of the present invention; unless otherwise specifically claimed.

Figure 2E:
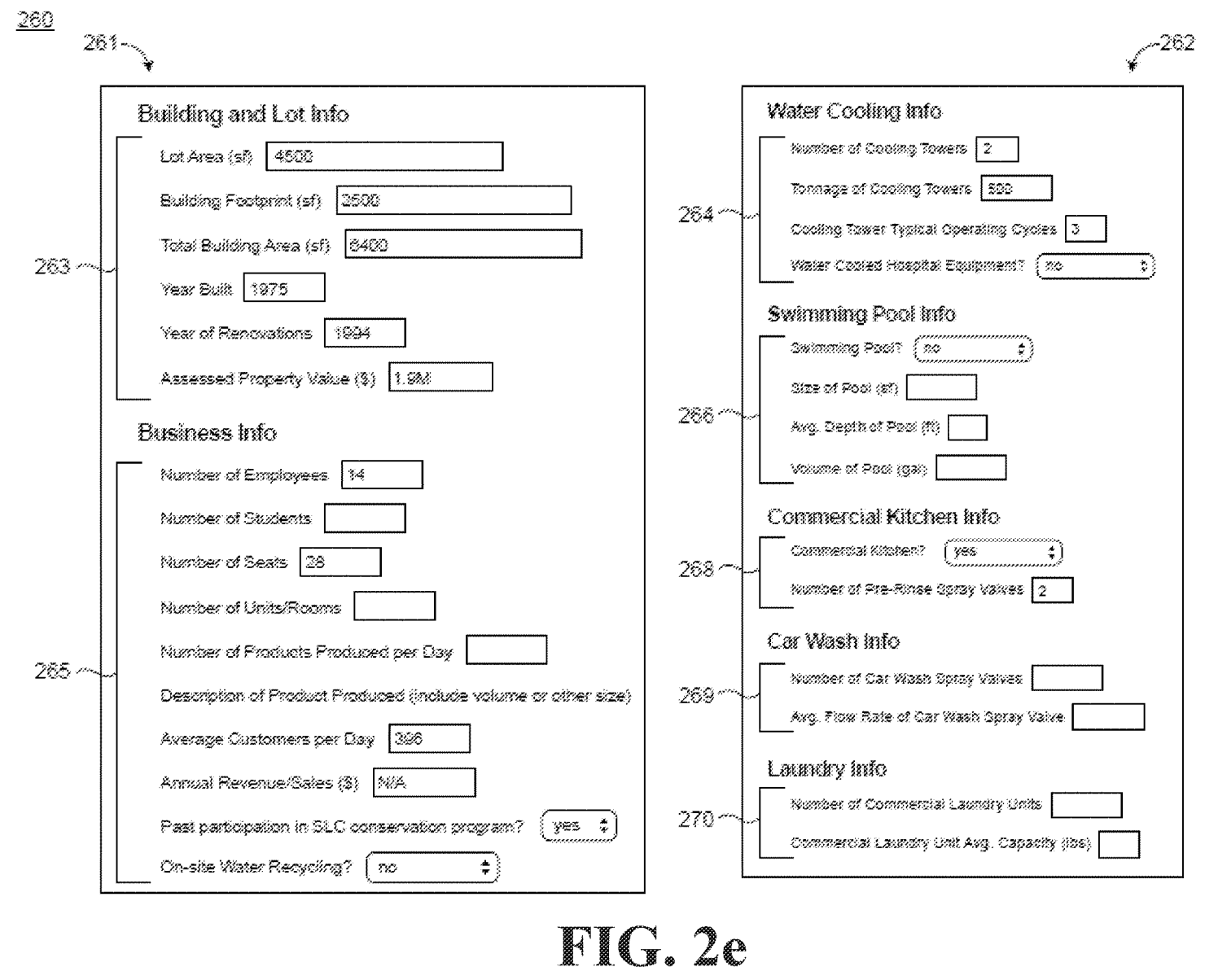

Still other example embodiments allow for the use of one or more utility audit tools in providing added input related to the targeted customer's consumption of utility resources. For example, as illustrated in FIG. 2(e) a utility customer can use the commercial utility audit tool 260 that provides the customer with a user interface 261 for entering additional information related to the customer's building and property 263, which consumes the utility resources. More specifically, in this instance, the water utility customer can capture building and lot info 263 including, for example: building size; age of the building, date of last renovations, etc. Similarly, the customer (or the utility usage analytics tool or the resource manager or administrator) may set fields for the industry classification for the business and other related attributes 265 for business information such as number of employees, average customers per day, number of units/rooms, etc. Next, the customer, utility use analytics tool, and/or the resource manager may use the interface 262 for providing added information about the types of amenities that affect the utility usage for the targeted customer. For instance, the utility resource conservation system shown allows for input of water-cooling info 264, swimming pool info 266, commercial kitchen info 268, car wash info 269, laundry info 270, or any other information about how the targeted customer consumes utility resources—in this case, water.

As one skilled in the art will further recognize, exemplary embodiments may use these and other similar added metrics for assisting in or determining appropriate utility consumption levels relative to similar entities of a similar class. For example, the conservation tools may want to compare water usage for industry standard entities in a "hotel" class, which further include "swimming pool" information. Thus, this subclass or added information related to the consumption of the utility resource further defines the industry standard classification code used for setting utility consumption threshold values.

Of course, other data input from external sources outside the utility company or customer may also be used in further defining a class for a targeted customer or for defining industry standard consumption thresholds. For example, the utility usage analytics tool described herein can use public information gleaned thru the internet for setting parameters or passing information related to the use or consumption of the utility resources. For instance, in the above example for FIG. 2(e), information about the property amenities may be pulled and downloaded from a description of the hotel on the web. The known, related utility consumption data may then automatically populate into the appropriate fields for use in setting industry standard classification thresholds based on the added utility consumption information and/or used in defining customers of a targeted industry standard class.

Figure 3:
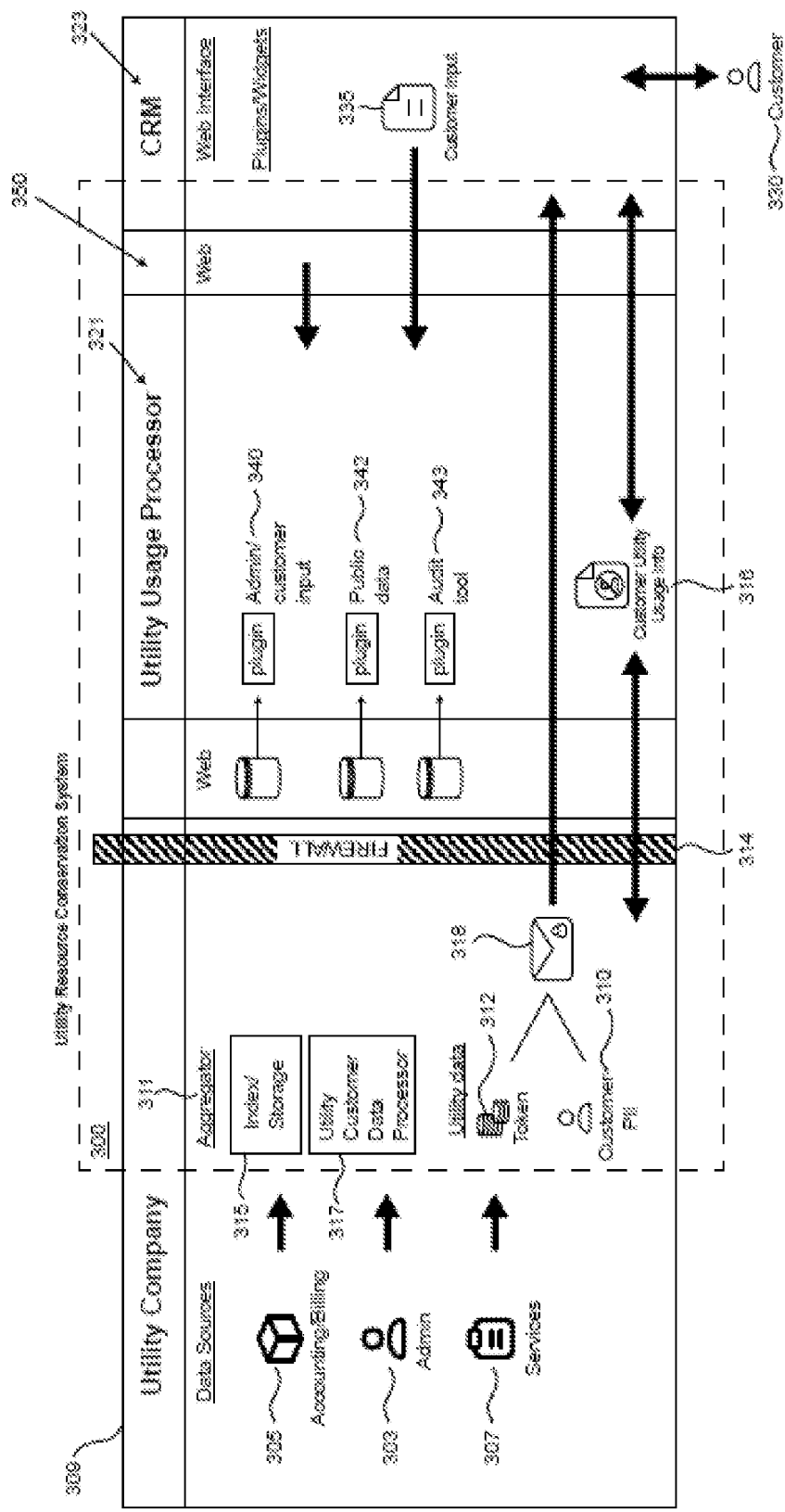
FIG. 3 illustrates an example embodiment of tokenizing or autotomizing the data used for the analytics in accordance with example embodiments of the present invention.
Figure 4:
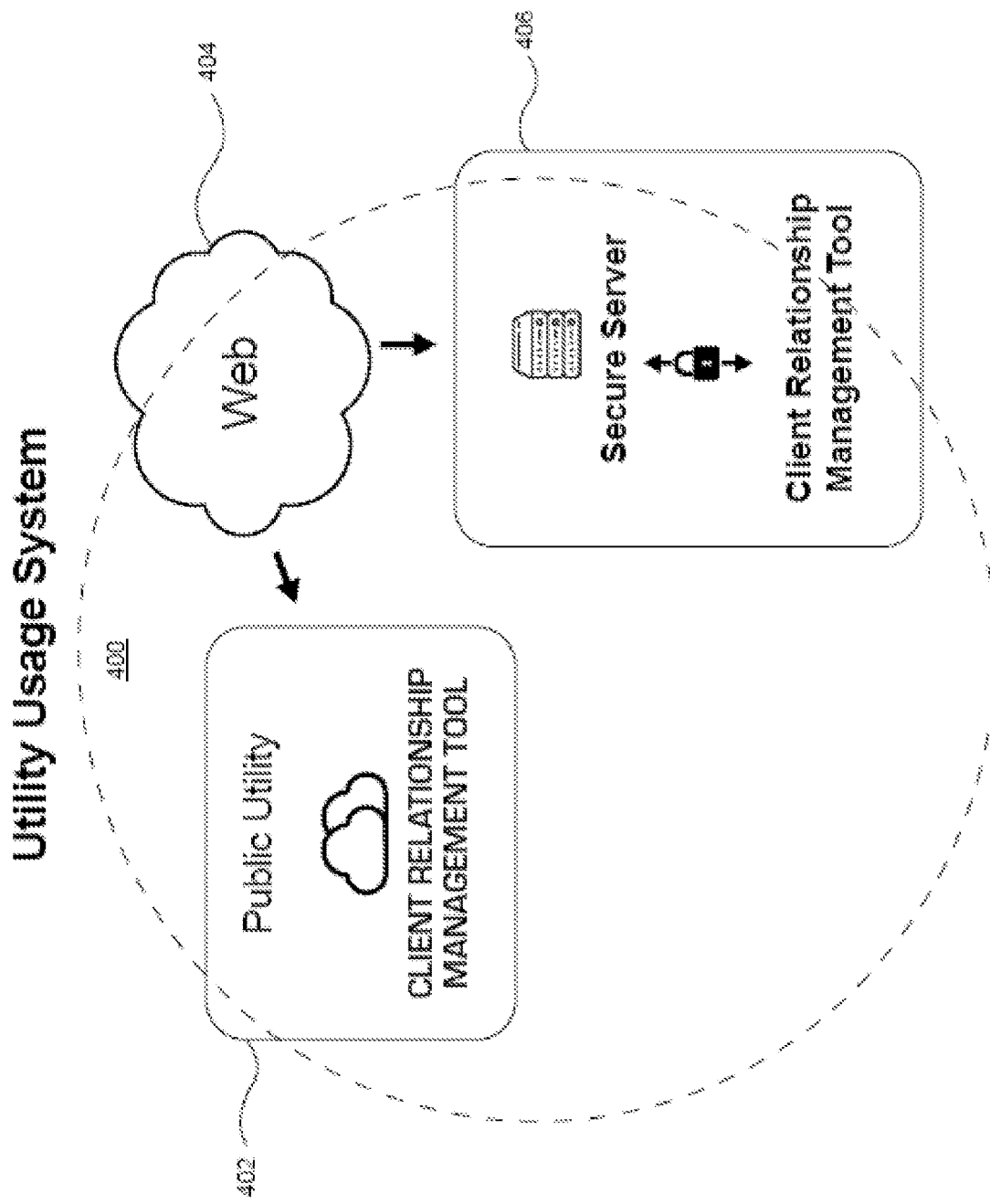
FIG. 4 illustrates the data flow and data usage between the utility data, customer relationship manager data, and exemplary servers for processing and analyzing utility data in accordance with example embodiments described herein.

As shown in FIG. 3, after classifying and targeting of utility consumers based on a defined industry standard classification code(s) and utility resource consumption threshold value(s) for the industry class—and/or the use of added information about the targeted customer's utility usage for further defining the industry classification code and/or threshold value(s)—other example embodiments allow for targeted customers to securely receive communication about their utility usage, as well as information about available audit, conservation, or rebate programs available. For instance, in FIG. 3, the resulting conservation action may allow targeted customers to receive message(s) about their utility consumption via a Customer Relations Management (CRM) 323 tool or enterprise communications portal (e.g., Salesforce™).

Also shown in FIG. 3, there are various servers utilized across varying platforms and infrastructures within the utility resource conservation system 300 as described in various exemplary embodiments herein. More specifically, first, the utility company 309 incudes various data sources (e.g., information from accounting/billing; resource manager or admin input 303; and other services tools 307 used to gather information about the targeted customer's 330's consumption of the utility resources. Next, the utility usage processor 321 (i.e., the utility use analytics tool), which filters or otherwise processes the customer usage information and aggregates 311 or otherwise processes the data in accordance with exemplary embodiments described herein. Third, the CRM 323 (e.g., the Salesforce) server, which then associates costumer utility usage reporting data with the customer for communication and other purposes in accordance with example embodiments described in greater detail below.

Although the utility usage processor 321 can ideally be deployed behind the utility company 309's firewall 314, such does not allow for the added use of consumption information external to the utility company 309. In other words, because the utility analytics tool or usage processor 321 acts as a communication bridge between the utility company 309 the web 350, and the CRM 323, the security of the utility company's data remains of high importance—especially in a world where users' personal data or personally identifiable information (PII) is at risk of being stolen and misused.

In accordance with an example embodiment described herein, added data security is achieved by deploying a docker container, which is simply an instantaneous copy of the existing public utility database as if behind the utility's firewall. This allows a one-way communication feed from a master database on the utility company's infrastructure 309 to a conservation database utilized by the utility usage processor 321, which resides outside the firewall 314 of the utility company 309. Thus, example embodiments do not allow data from external sources (i.e., sources outside the utility company 309 and customer 330 but, that still relate to the customer's usage of the utility resource), to go back into the master database behind the utility company's 309's firewall 314. In other words, example embodiments use a docketing mirror copy of the Utility company's database for ensuring that information from external sources (e.g., the utility use analytics tool or usage processor 321, input from customers or user of one or more utility audit tools 343, data pulled from the web 342, or other data from other external sources never gets stored on the master database behind the utility company's 309's firewall 314.

In other words, FIG. 3 illustrates a utility resource conservation system 300, which shows an aggregation of data 311 from, for example: (1) internal source of the utility company 309, (e.g., accounting/billing 305, admin input 303, or other service information 307); (2) additional data supplied by an admin/customer 345 (such as number of people in a household, number and tonnage of the cooling towers, swimming pool size, etc.); (3) publicly available data 342, e.g., climate data from a National Oceanic and Atmospheric Administration (NOAA) API; (4) the utility usage analytics tool 321; and (5) all the utility auditing tools 343; and other data sources—as described herein and below. The utility resource usage data may then be processed in the utility usage server 321 and communicated to the customer either through the communications portal (e.g., CRM 323), or directly via email or other message sent to the customer 330.

To maintain even tighter control over security concerns, other example embodiments tokenize utility consumption data transferred between servers to protect customer Personal Identifiable Information (PII) 310 and other data—thereby autotomizing or anonymizing any association between consumer consumption and PPI info 310 (e.g., service id, address, etc.) The utility consumption data and communications may come from the utility alias, however, the messages and information lives on and is served from the CRM 323—not on the utility usage processor 321 or utility conservation system 300.

More specifically, example embodiments provide that whenever PII data 310 is used (e.g. name, account number, etc.), a new, partially random ID for the corresponding object (e.g. customer, account, etc.) is created (i.e., tokenized customer PII 312). This ID may be a twelve (12) byte value stored as a hexadecimal string, but of course any other format or string type may be used. According to one example embodiment, part of the value may be based on the current date/time, while the rest of the bytes are randomized.

In accordance with other embodiments, the PII data 310 may then be transferred and stored in the CRM 323 (e.g., SalesForce) alongside this new token or ID 312, whereas only the new ID 312 and any non-PII data 316 are stored in the processor database 321 (e.g., a cloud or other server). The data also remains on the utility company's system (as it would if they were not using the present innovative utility conservation system and tools)—since as described above, example embodiments only pull a copy of the data set.

In other words, when PII data 310 is needed (e.g., when sending a message to the customer), the processor uses the new ID 312 (token) to pull out the data from the CRM 323 and unite it with any non-PII data 316, which then gets sent to the customer 330 for reporting and other conservation uses. Note that the "re-constructed" data 318 and 316 is not stored (albeit, short-term caching may be implemented) on the processor 321. Instead, it is only used as the "go-between."

In one embodiment, different tokens may be used for different use cases to prevent discovery of PII through cross-reference or cross-correlation analysis. Under this approach, a customer may have multiple tokens in use simultaneously. Although each token may resolve to similar or identical PII, the use of different tokens for different use cases avoids the possibility of compromising PII by unnecessarily associating records—which can compromise the security and confidentiality of the PII under a token system.

Figure 5A:
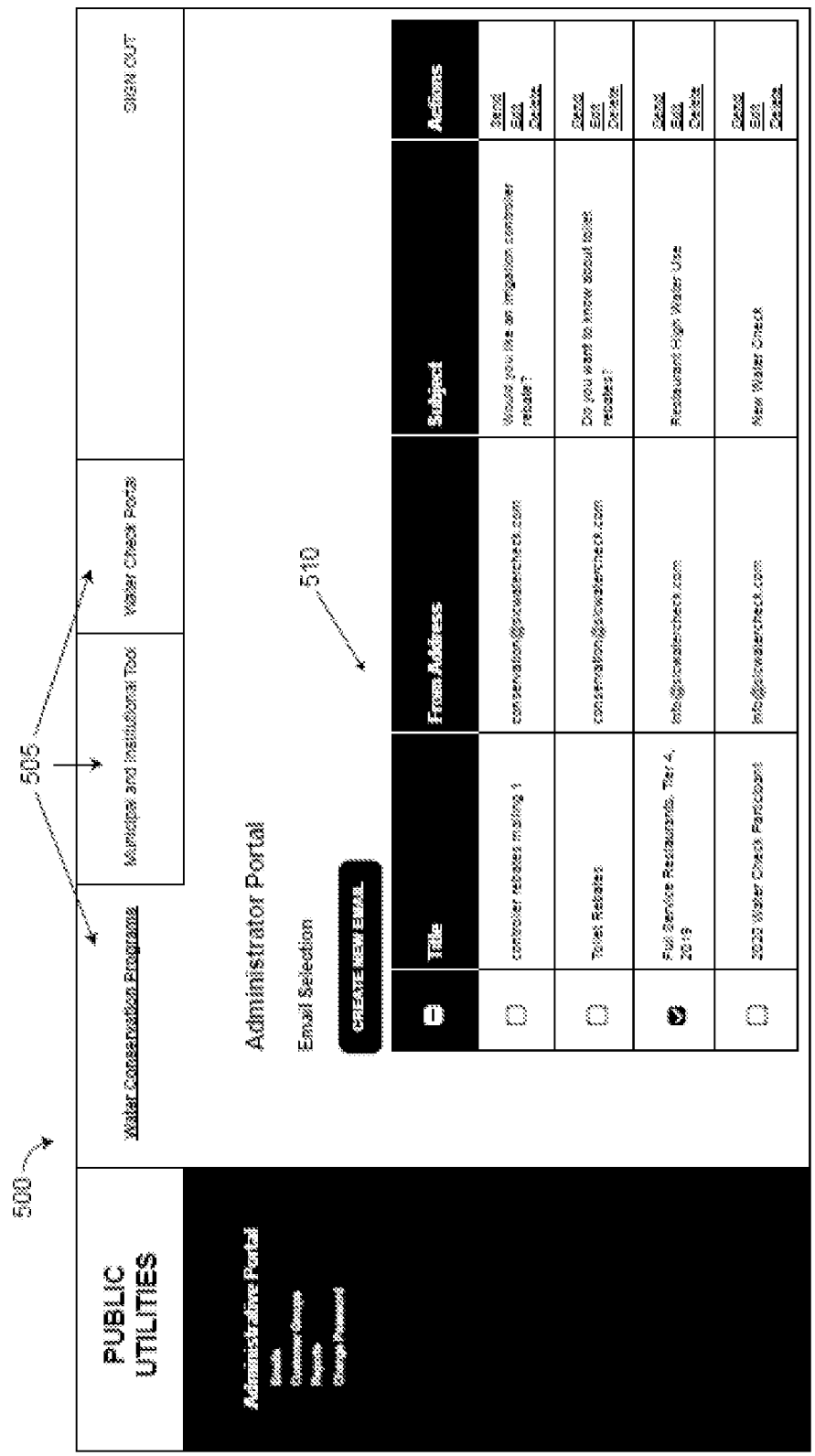
Figure 5B:
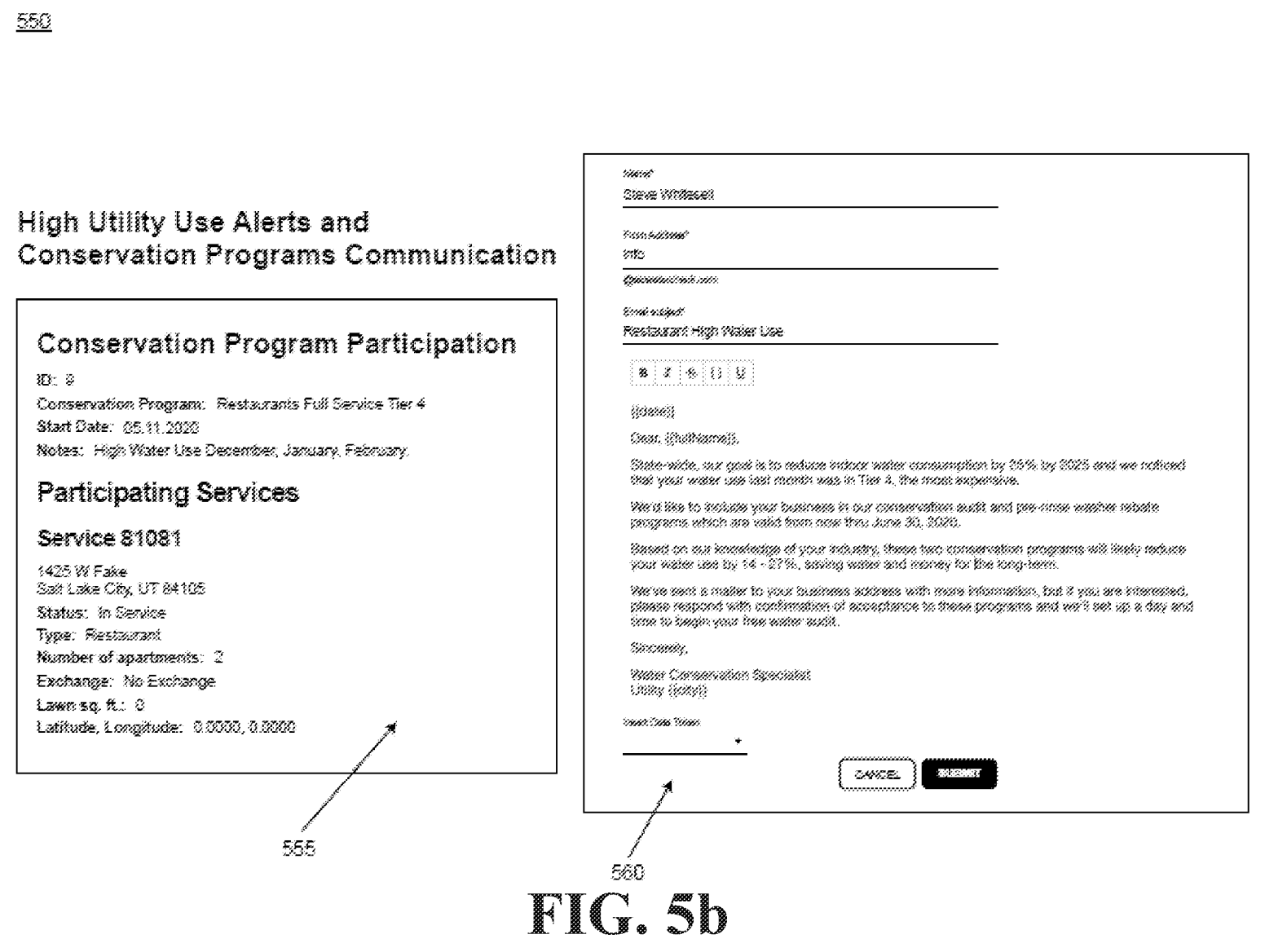

As previously mentioned, and as shown in FIG. 5(*a*), other example embodiments provide a conservation manager with the ability to add participants to email lists, or to an audit, conservation, or rebate program, based on the industry standard classification code set and one or more consumption threshold values. For instance, as shown, an admin may utilize the public utilities portal 500, which provides an interface with varying tools 505 and other admin input (e.g., available audit, conservation, or rebate programs 510 available). In this particular case, thru the administrative portal 500, the conservation manager is able to target and email customers about the customer's utility use for Full Service Restaurants, with 3 or more billing periods in the year 2019, for customers in tier 4 water usage.

Still, other example embodiments, as shown in FIG. 5(*b*) provide conservation managers or other admin to create custom and/or automated messages when reporting the customer's utility usage. For example, as shown in FIG. 5(*b*), any time a restaurant hits their third (or other predefined) billing cycle in tier 4 (also definable), they may get an automated message about water usage, and/or be added to an audit, conservation, or rebate program. Of course, any number of other predefined parameters and resulting actions may be used to define usage alerts and conservation program communications.

In other embodiments, utility audit participants may get subsequent emails at predefined periods of time (e.g., 1-3 weeks) after receiving and/or requesting information about the auditing results. Some embodiments also contemplate that if users make recommended changes to one part of their utility usage (e.g., changes to their irrigation system), they may get additional rebates. For example, as described and shown in greater detail below, as users make use of the monitoring and audit tools provided herein, example embodiments can automatically determine the changes made and provide additional rebates or incentives as the suggested repairs or changes are made.

Still other example embodiments contemplate the use of historical data that monitors a utility customer's progress for completing an assigned audit, conservation, or rebate program. Such monitoring may allow for verification of the efficacy of similar programs across customers in similar industry standard classifications. In other words, the conservation system may consider monitored audit, conservation, and rebate programs as a success as more and more customers complete assigned tasks within the audit, conservation, or rebate program. In fact, even as individual targeted customers gradually complete steps for the assigned programs, the conservation system may use such information in determining the efficacy thereof. Such information may also be shared with other utility companies in other geographical locations, such that they can try similar audit, conservation or rebate programs proven successful in accordance with exemplary embodiments described herein.

Figure 6:
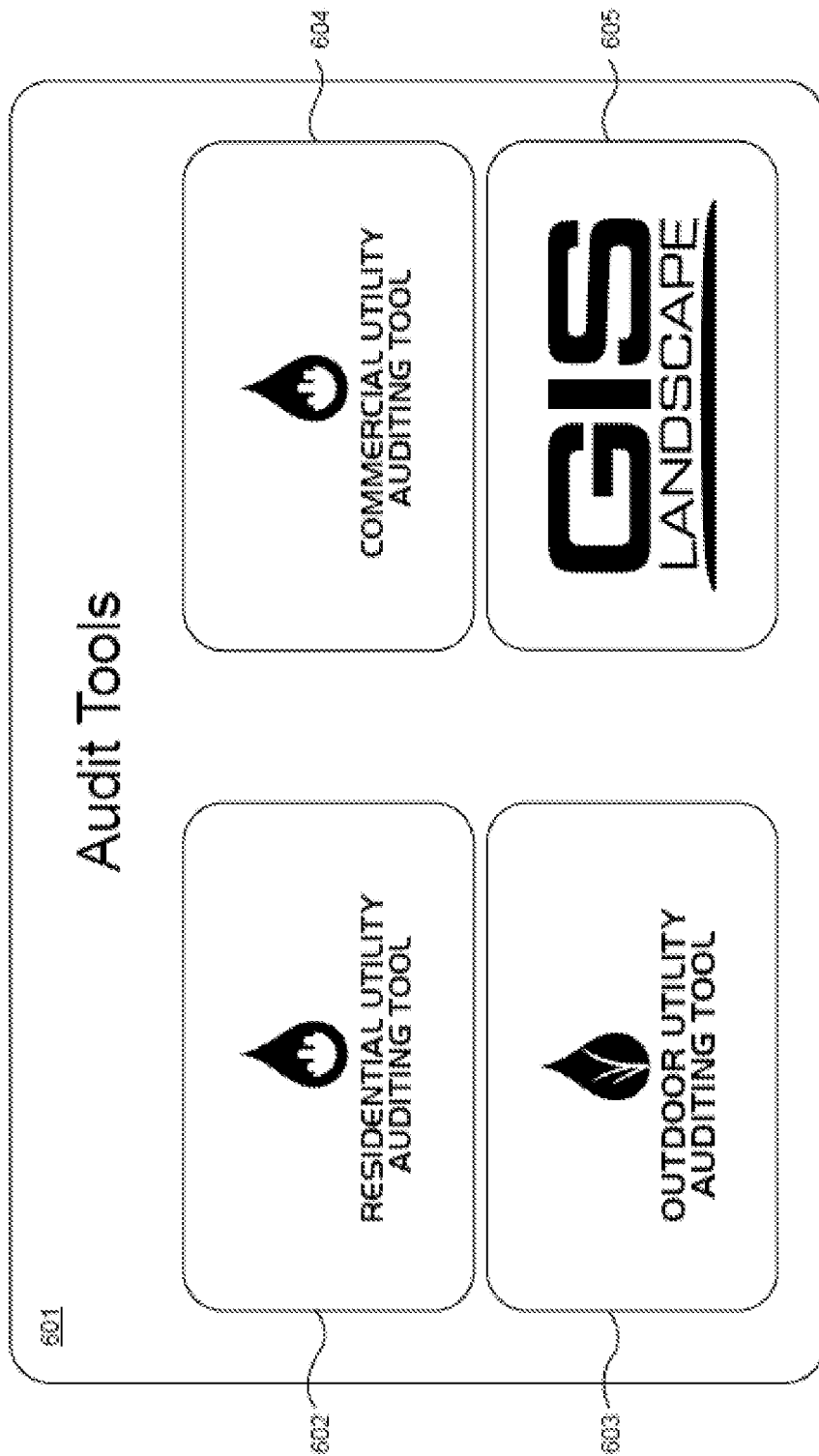
FIG. 6 illustrates the a few of the outdoor auditing or monitoring tools specific for irrigation systems for use in the auditing methods, systems, and computer programs products according to exemplary embodiments described herein.

As previously noted in FIG. 1, exemplary embodiments utilize various auditing tools for providing added information for industry standard classification or for setting consumption threshold values. Such auditing tools may be residential 320, commercial 325, governmental 333, or other utility auditing tools 335. Note that the input data for the auditing tools may vary based on the type of auditing tool used (e.g., residential v. commercial, etc.). Further, even within the similar auditing tool (e.g., commercial utility auditing tool 325), other parameters or fields may be used for further defining industry standard classifications or setting threshold values within each industry sector. For instance, as shown in FIG. 6, example embodiments provide for at least two irrigation audit tools 601, including outdoor utility use audit tool 603, plus a Geographical Information Systems (GIS) Landscape™ tool 605 for larger commercial applications like schools, parks, golf courses, and other large commercial properties.

As previously referenced, these tools allow for in-field evaluations with customized irrigation system reports to increase irrigation system efficiency. Moreover, for data security, example embodiments contemplate that when a customer authorizes an audit they may indemnify both the utility and third parties from liability. Nevertheless, regulations on data collection and storage vary from state to state and need consideration on an individual basis.

The outdoor utility use audit tool 603, 605 (and even the residential utility audit tool 602 and commercial utility audit tools) may be tablet-based applications that capture a myriad of landscape and irrigation system information including, but not limited to: Plant type, Landscape Slope, Sun Exposure; etc. As shown, additional information may also be useful in making overall assessment and analysis of such outdoor irrigation systems, e.g.: controller make and model; irrigation days per week; zone run times, etc., for identifying landscape or irrigation parameters that influence industry classification and consumption threshold settings in accordance with exemplary embodiments of the present invention.

Figure 7A:
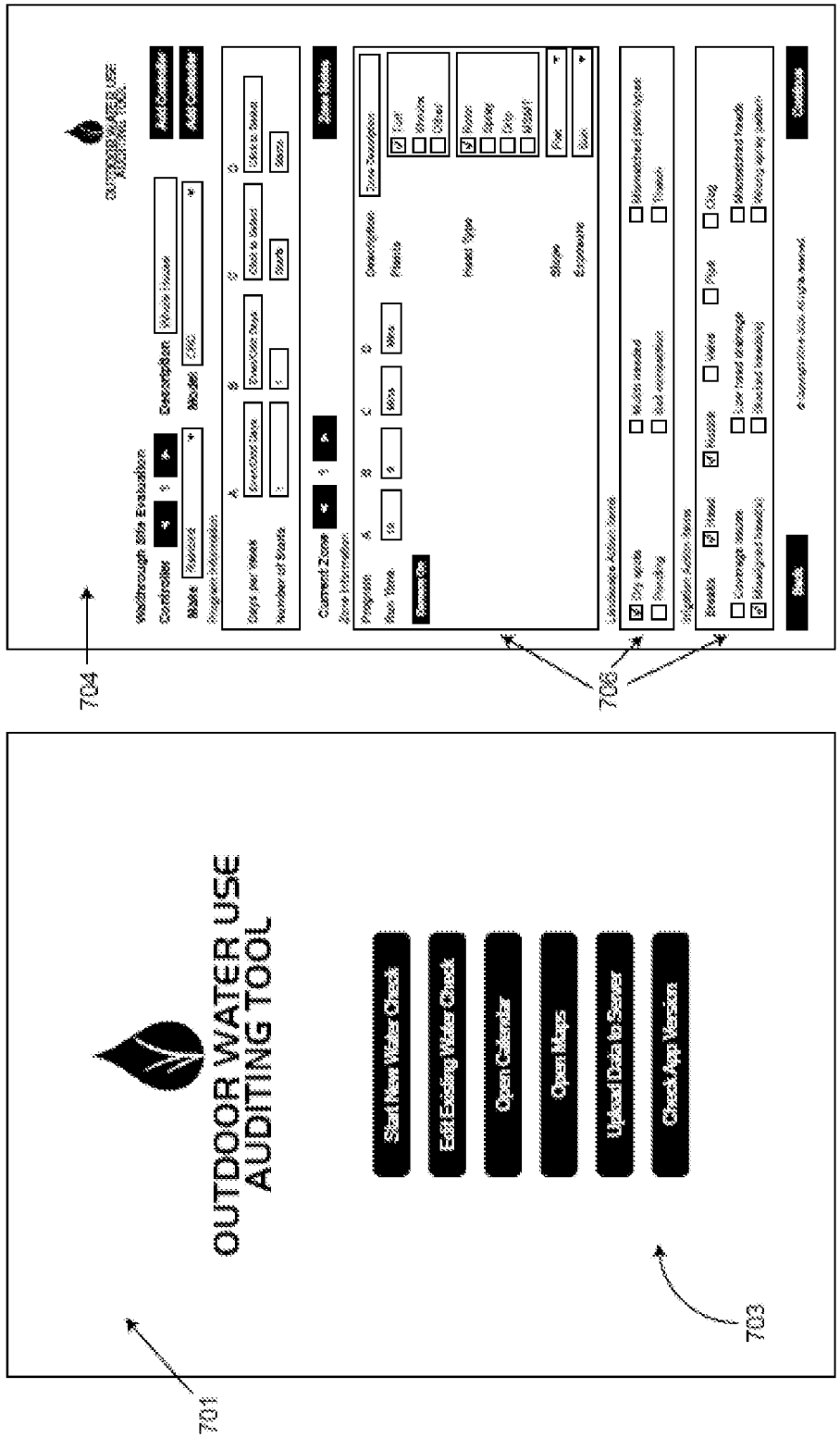
FIGS. 7(a)-7(c) illustrate the use of the WaterCheck outdoor API and example reporting in accordance with exemplary embodiments described herein.
Figure 7B:
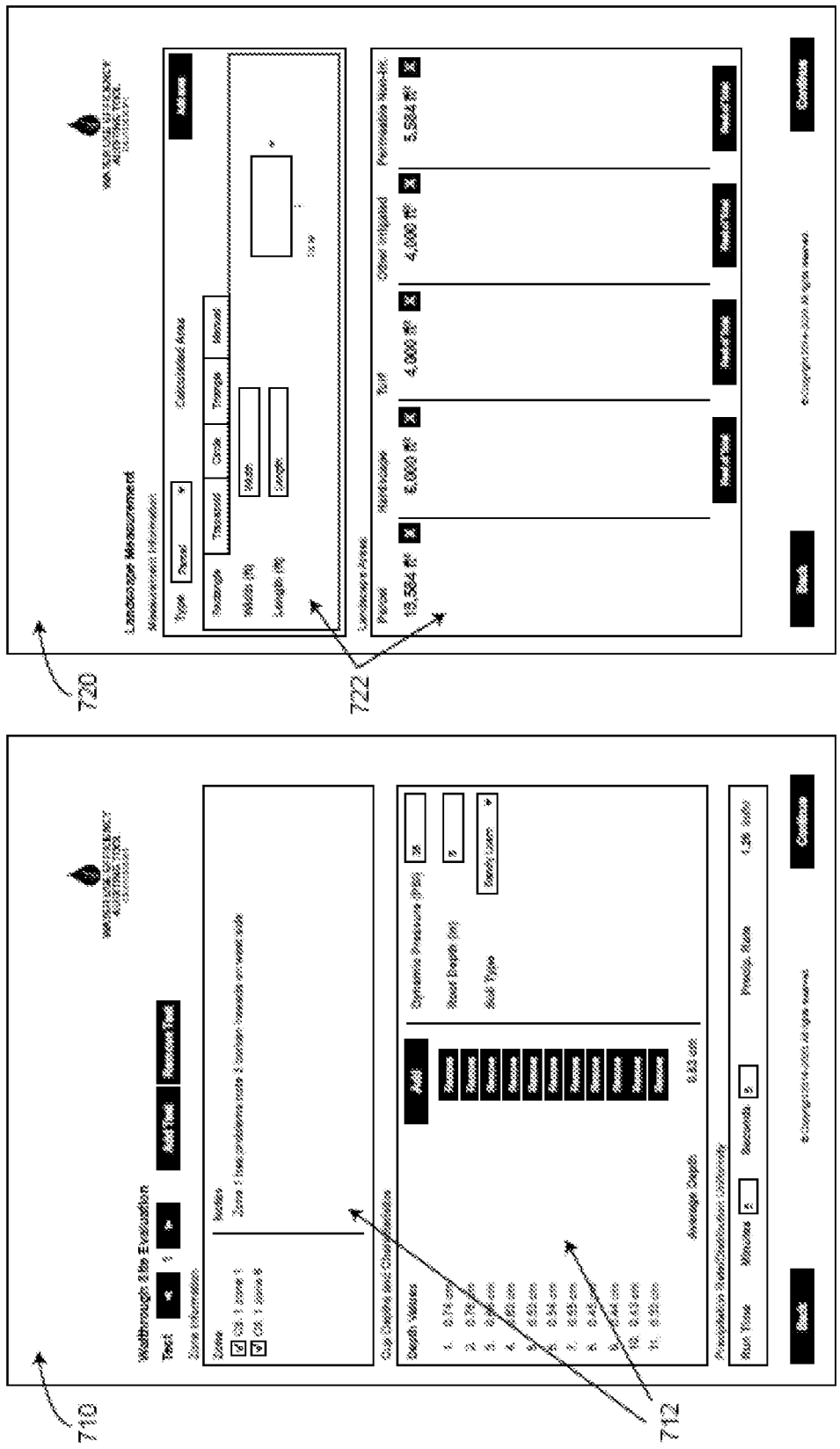
Figure 7C:
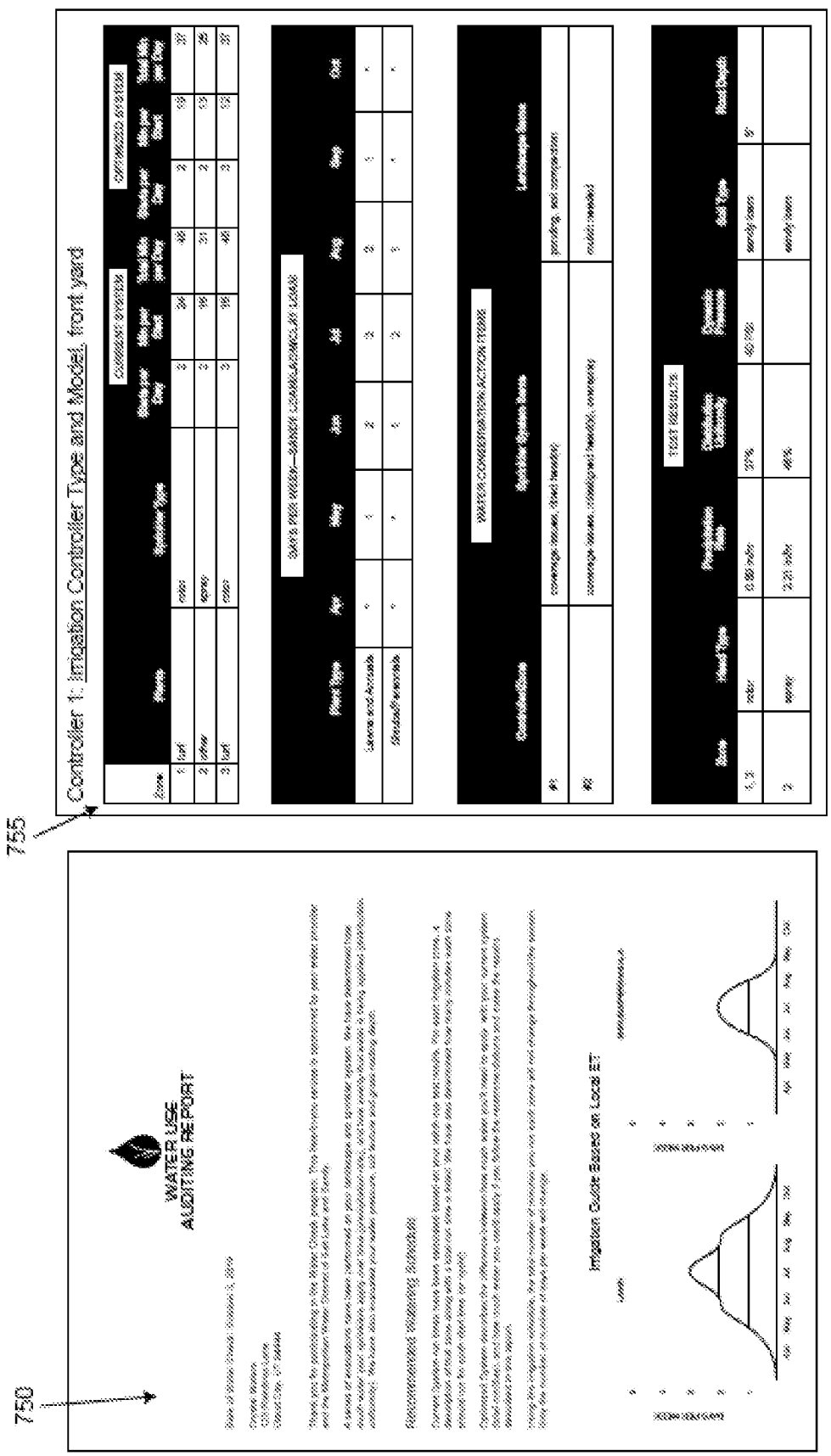

Other example embodiments may also collect outdoor irrigation information for use in classification and normalization for threshold settings. For example, as shown in FIG. 7(*a*), example embodiments provide for an outdoor water auditing tool 701 that allows a customer, grounds keeper, resource manager, or other user to use the auditing features 703 for inputting added information about the irrigation system. For instance, as shown in FIGS. 7(*a*) and 7(*b*), a water utility customer may use the interfaces 704, 710, 720 for inputting information through the irrigation system fields 706, 712, 722, which provides added information about the outdoor irrigation system's water usage including, for example: irrigation system components (e.g., types of heads and volume output); distribution uniformity information by zone (e.g., zone run times, sprinkler head volume output, etc.); parcel, landscape and zone measurements; and other outdoor irrigation information used in accordance with other example embodiments. As shown in FIG. 7(c), this data may then be associated with local evaporation transpiration (ET) to develop optimized run times and suggested landscape or irrigation action items 725, which can then be relayed to the homeowner or property manager via an output report 750, 755 with optimized zone run times as described in other example embodiments herein. In addition, the output report 750, 755 may include irrigation days per week, water conservation action items, and zone test results, etc.

Figure 8A:
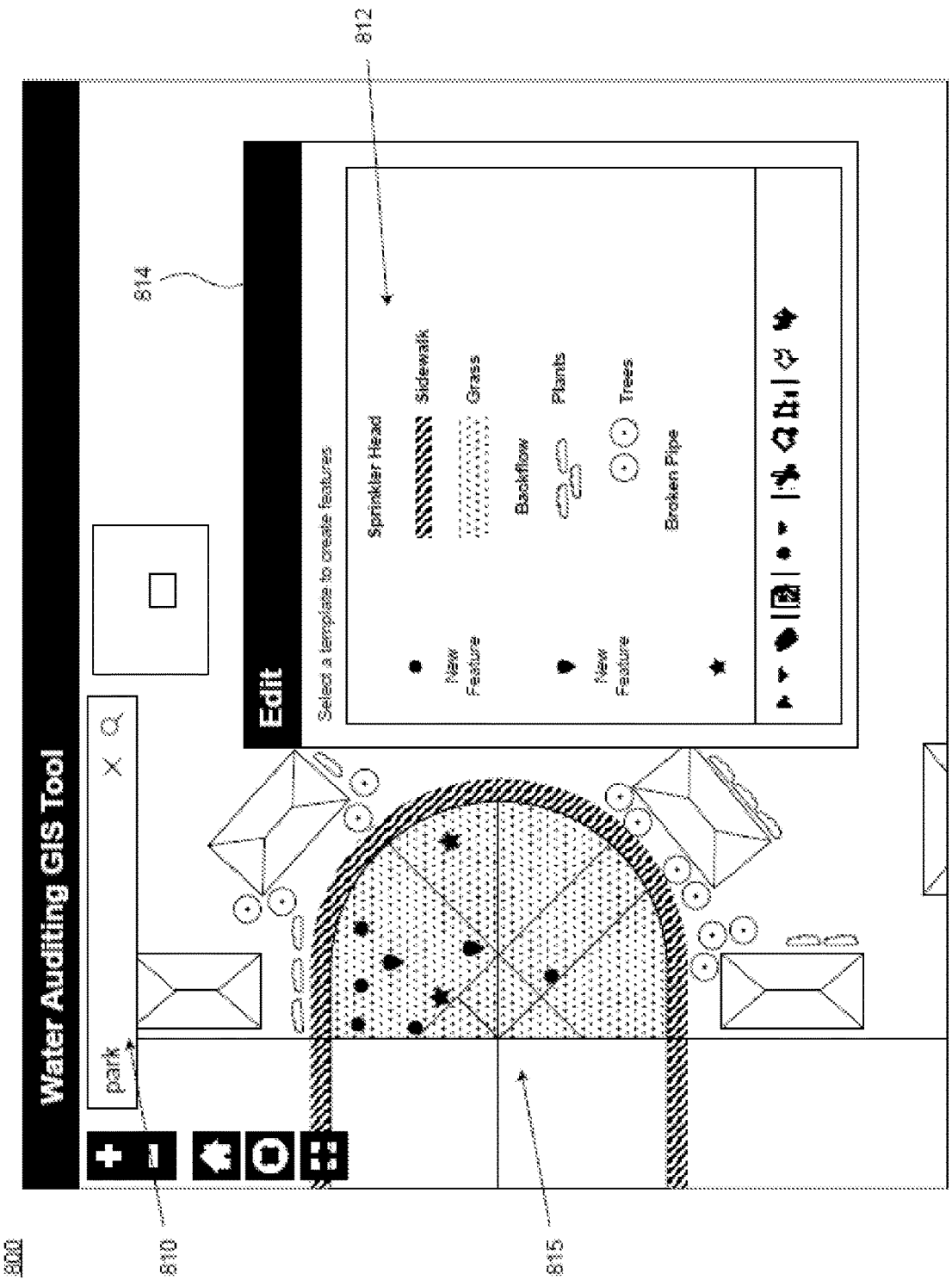
FIGS. 8(a)-8(b) illustrate the use of the GIS system for irrigation outdoor monitoring and auditing in accordance with exemplary embodiments described herein.
Figure 8B:
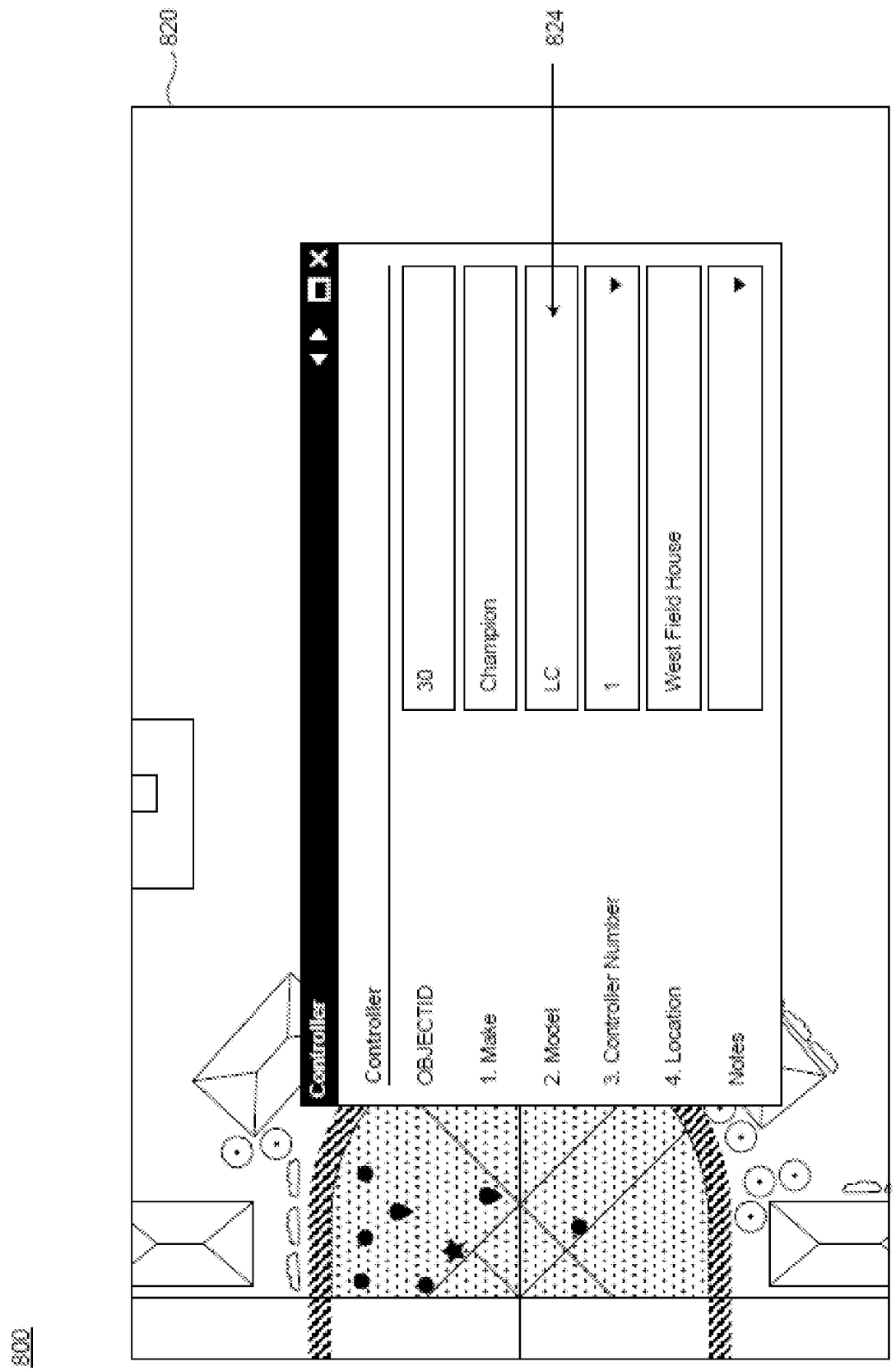

As shown in FIGS. 8(a) and 8(b), other auditing tools may include GIS Landscape tool, which helps inventory and analyze irrigation system data from large commercial applications like parks and schools—systems typically known to be older and less efficient. The GIS Landscape audit tool allows for multiple users, individually, simultaneously, and/ or even remotely, to collect, record, update, modify, delete, or otherwise create data that defines various landscapes, zone areas, various plant types, soil conditions, turn on/off locations, and many other zone attributes and properties.

In accordance with exemplary embodiments described herein, as heads and pipes get updated or fixed, or controllers changed, the customer, facilities manager, grounds keeper, utility administrator or other assigned user may have the ability to update the irrigation system information and report to, e.g., succeeding managers and administrators in accordance with example embodiments described herein.

Figure 9:
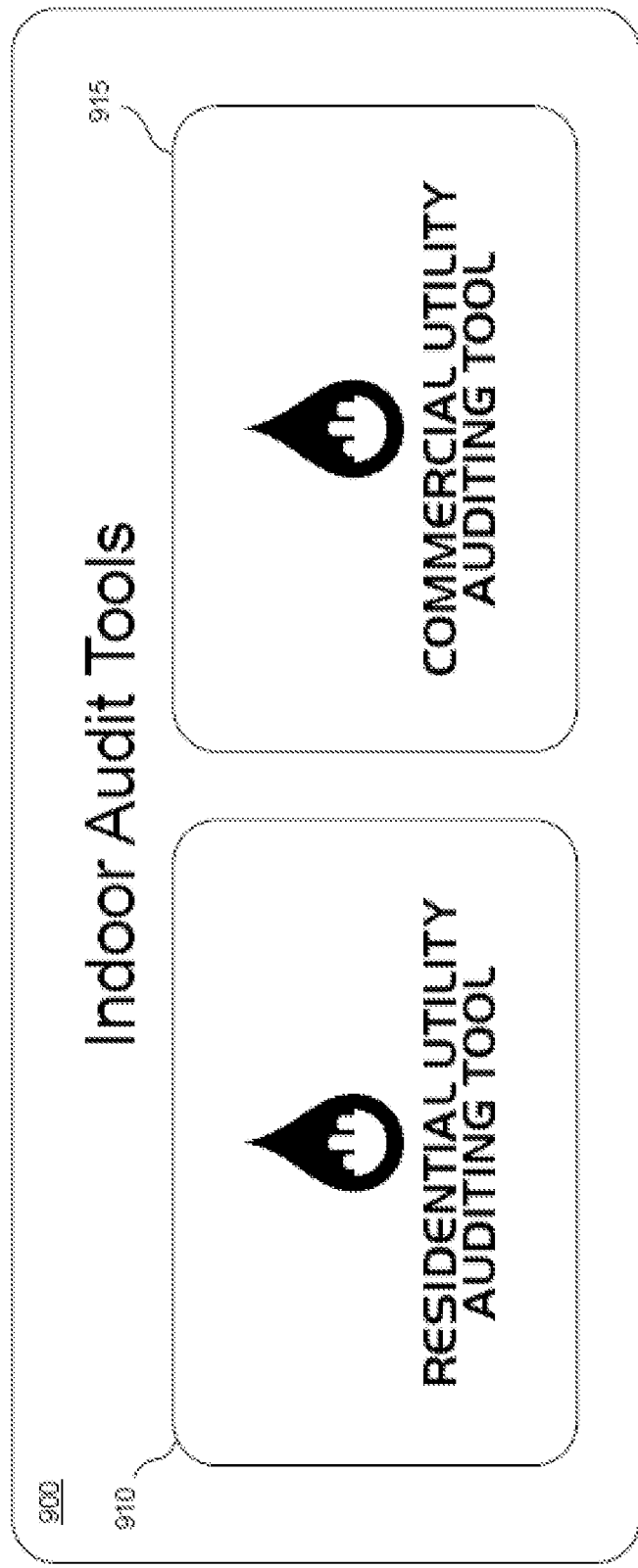
FIG. 9 illustrates the two types of indoor water audit tools for use monitoring and auditing specific utility usage in accordance with exemplary embodiments described herein.

As illustrated in FIG. 9, example embodiments also contemplate use of two indoor water auditing tools 900, i.e., a residential water utility auditing tool 910 and a commercial one 915—either or both of which may be tablet-based tool to assist in calculating and reporting on such things as a water balance 1100 report, which may include a pie chart 1110 and comparative water consumption for the property amenities 1105, suggesting repairs and water conservation return on investments (ROI).

Figure 10A:
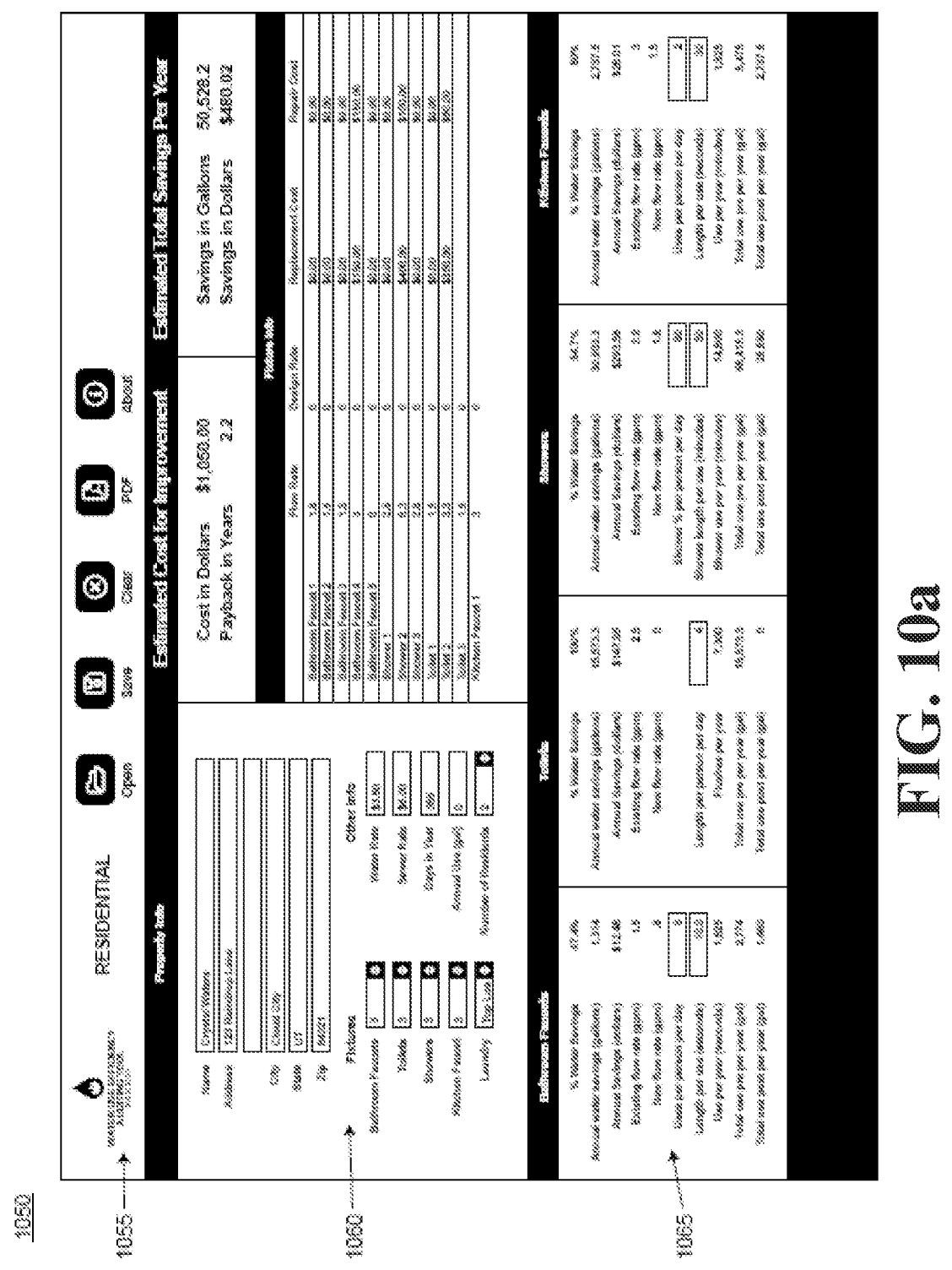
Figure 10B:
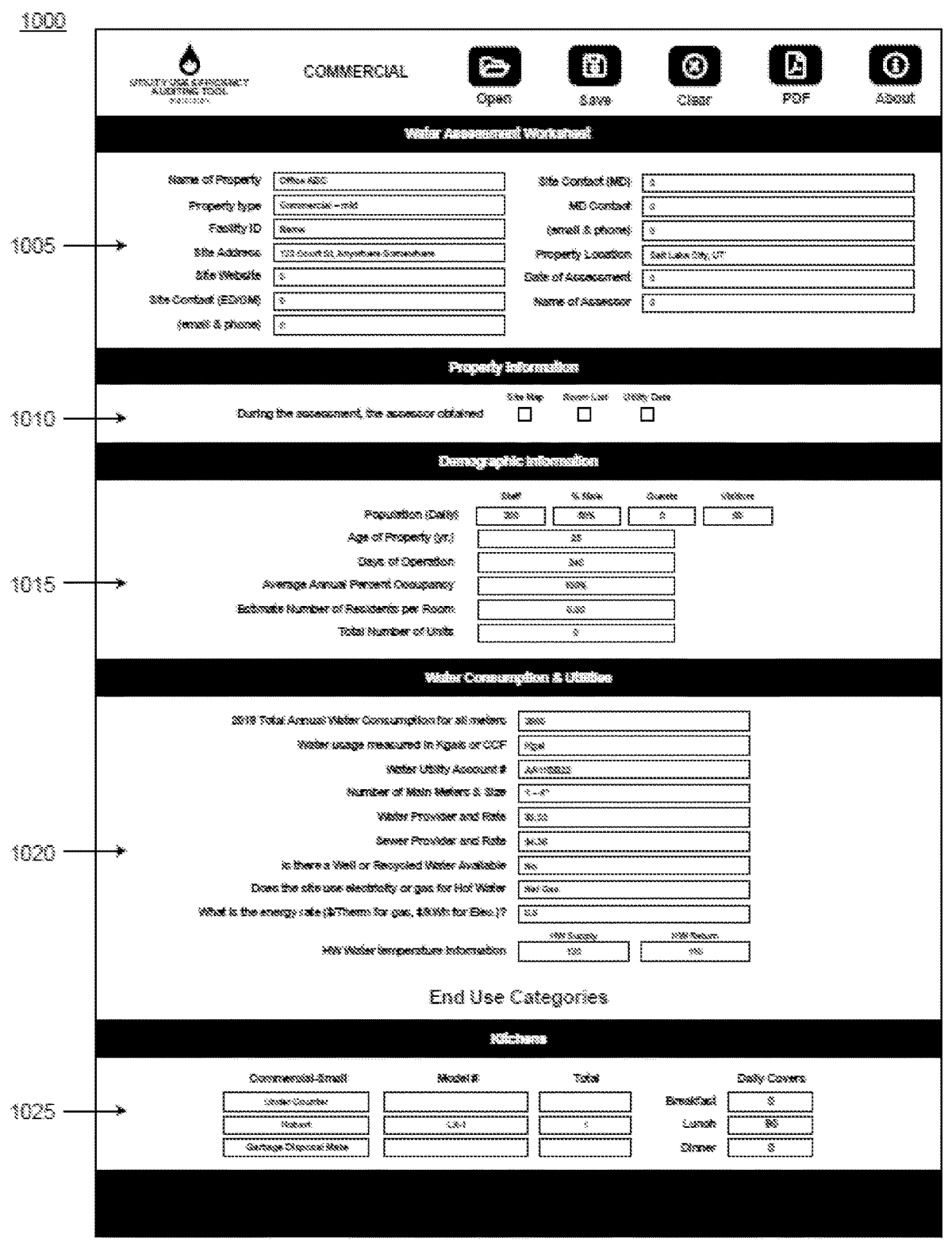

For example, as shown in FIG. 10(a)-10(b), residential water audit tool 1050 can collect property information 1060 and water fixtures 1065 for determining such things as water fixture flow rates; calculating repair or replacement costs; calculating savings and payback based on water and sewer rates; and send audit reports with a water balance to the customer in accordance with exemplary embodiments.

Figure 11A:
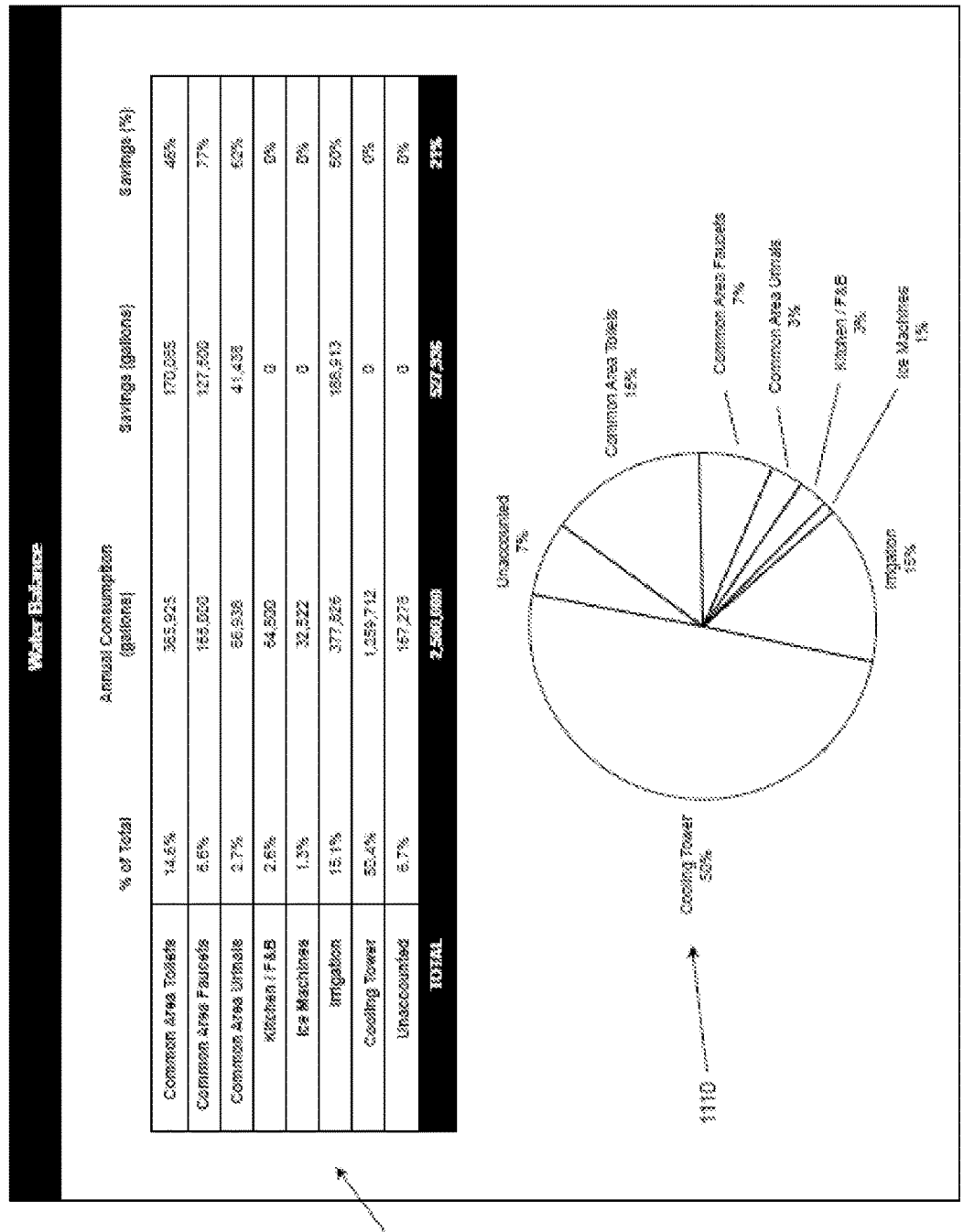
Figure 12:
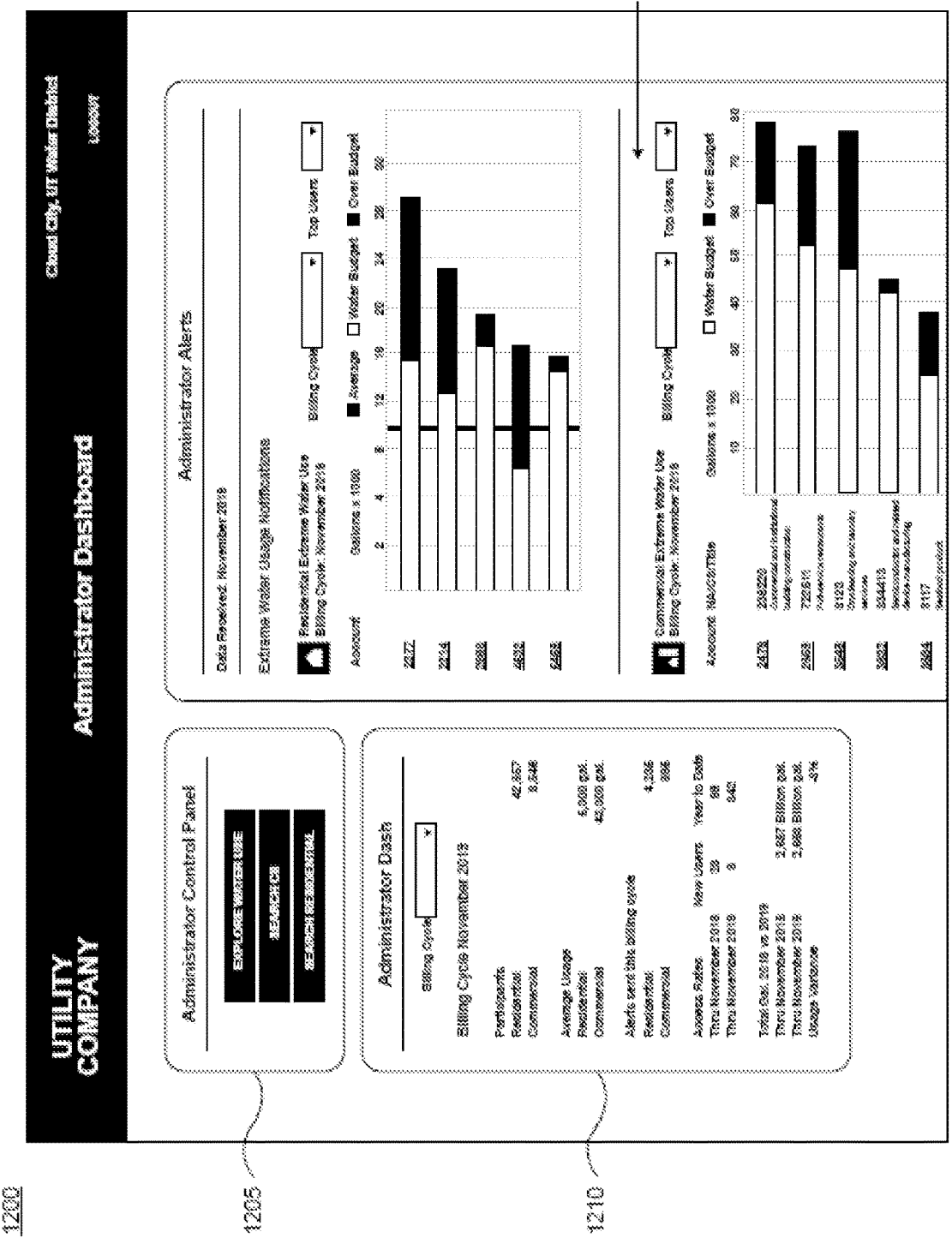
FIG. 12 illustrates an exemplary Administrator Dashboard in accordance with exemplary embodiments described herein.
Figure 13:
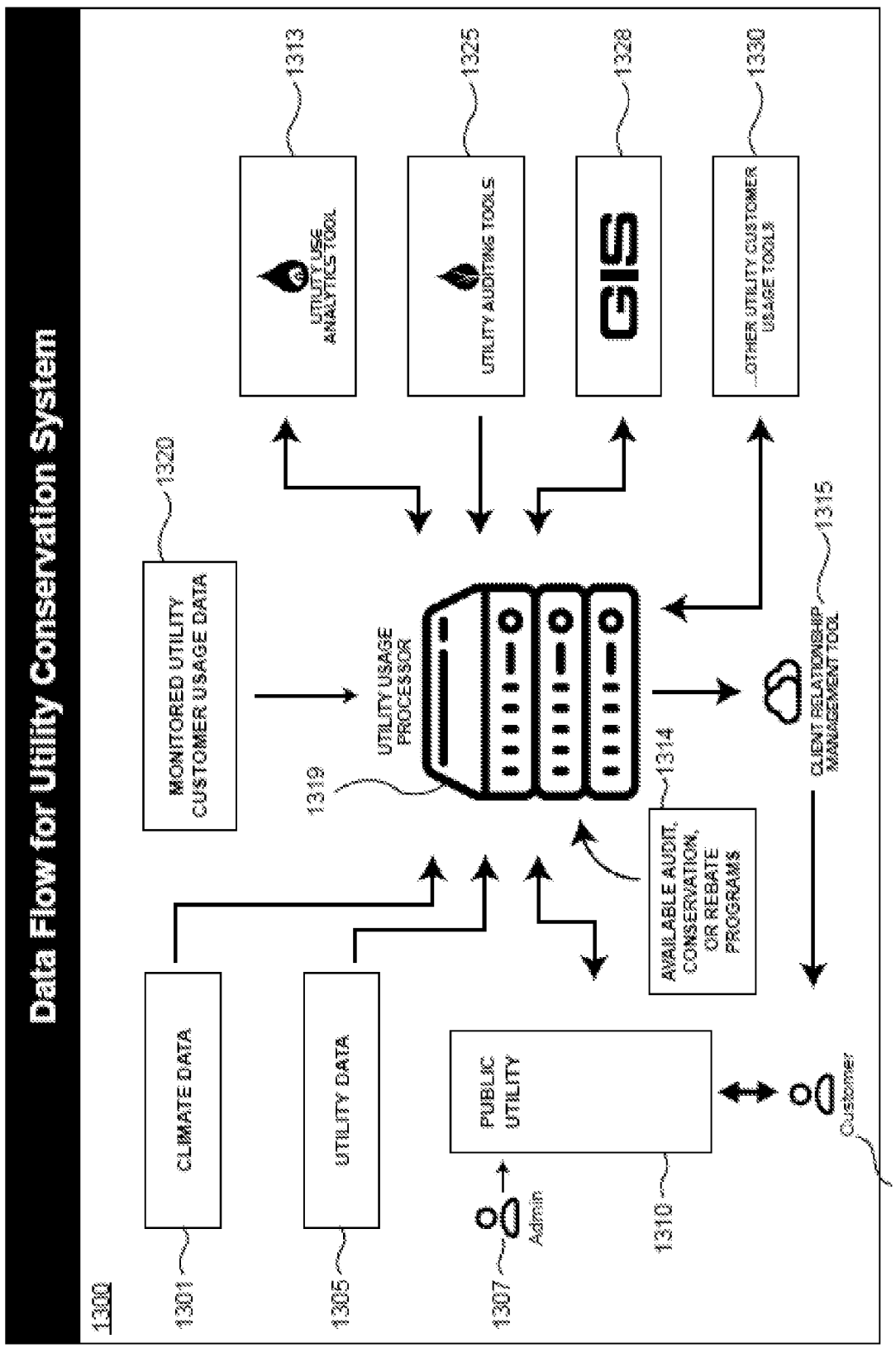
FIG. 13 illustrates the overall data flow as used for securely and efficiently targeting, communicating and auditing utility usage in accordance with exemplary embodiments described herein.

Similarly, as shown in FIG. 11(a)-11(b), commercial audits may include similar information as noted in the residential water audit plus such things as: cooling towers, kitchens, pools, ice machines, laundry facilities, pools, etc.—with a similar goal of providing a detailed water balance report in accordance with example embodiments.

If utilities have demand management problems, it is typically caused by resource depletion, increasing demand or legislative mandate. In any case, reducing demand through conservation is far more cost effective than building infrastructure.

In accordance with exemplary embodiments described herein, targeting and communications tools provide for rapid, cost-effective deployment. In other words, targeting and communicating with only those customers of a set type of utility consumer (e.g., highest water users), which may be determined based on the set industry standard classification code, which saves the utility time and money.

In summary, example embodiments descried herein (including the utility conservation system) allows conservation managers to target and communicate with specified utility consumer types (e.g., highest water users), further increasing their conservation program ROI. Using the example embodiments described herein further empowers conservation mangers to quickly and efficiently identify the highest offenders and assign them to potential audits, conservation, or rebate programs that may show rapid results and program benefits.

Figure 14:
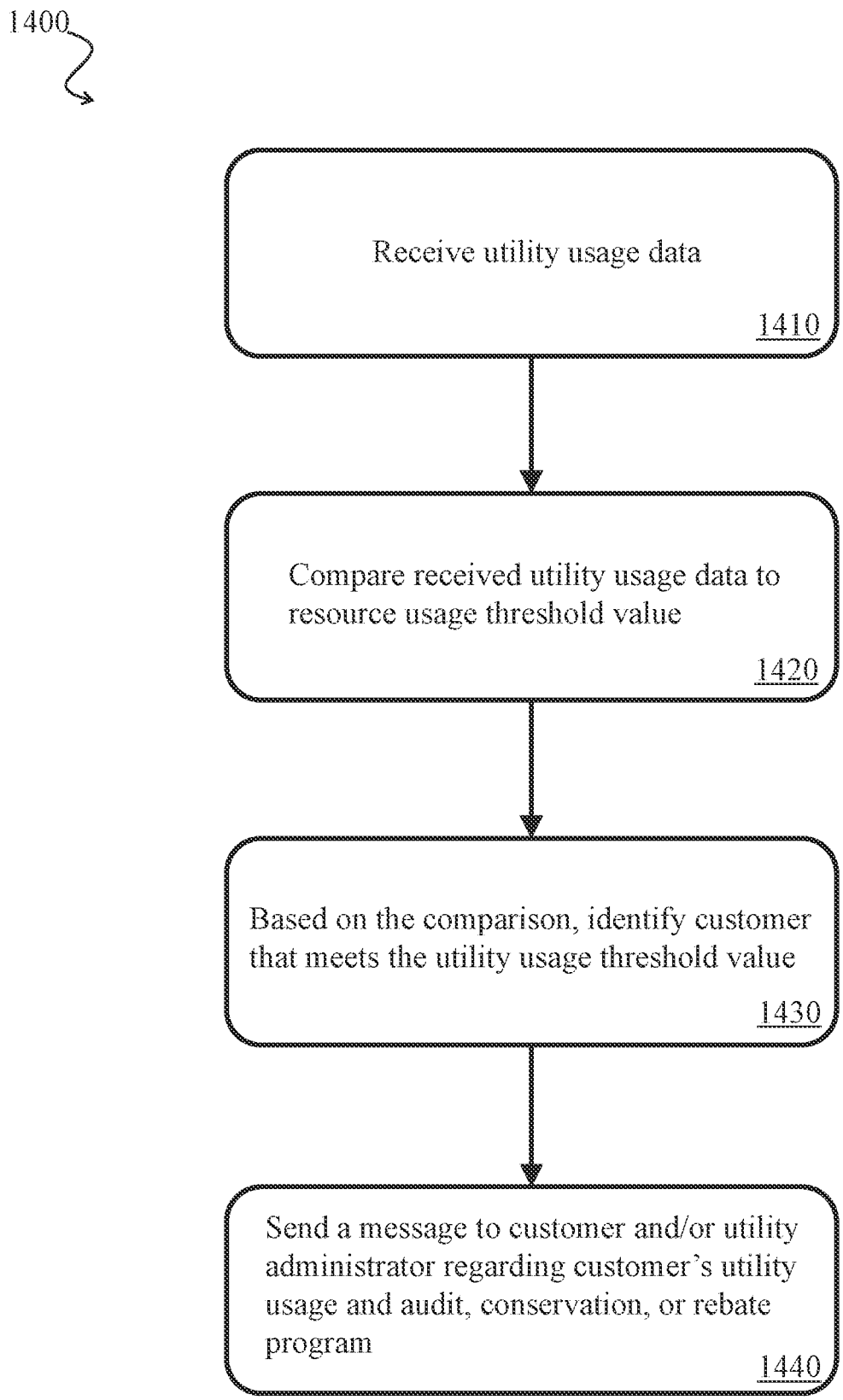
FIG. 14 is a flowchart for an exemplary method as described herein.

FIG. 14 is a flowchart 1400 for an exemplary method for a utility management and communication system identifying specific types of customers based on the need to communicate one or more audit, conservation, or rebate programs of availability.

At step 1410 the system may receive, from a utility company, utility usage data for a plurality of the utility company's customers, wherein the plurality of utility customers were chosen based on an industry standard classification associated therewith. The standard classification system may be the NAICS. In one embodiment the utility company may be a water utility company. In one embodiment, the data received from the utility company may include personally identifiable information ("PII"), and the system may replace the PIT with tokenized data and store the PII and tokenized data at a customer relations management system for subsequently targeting the plurality of customers in a secure manner.

At step 1420 the system may compare the utility usage data for each of the plurality of customers to a resource usage threshold value, which is set based on industry standard classification for each of the plurality of utility user, which is further set based on a desired audit, conservation, or rebate program available to one or more of the plurality of customers.

At step 1430 the system may, based on the comparison, identify one or more of the plurality of customers that meet the utility usage threshold value.

At step 1440 the system may automatically send a message regarding the identified one or more of the plurality of customer's utility usage and the desired audit, conservation, or rebate program available, wherein the message is sent to a utility administrator, the identified one or more of the plurality of customers, or both. In one embodiment the message may be sent via a customer relations management system, which may be Salesforce.

Figure 15:
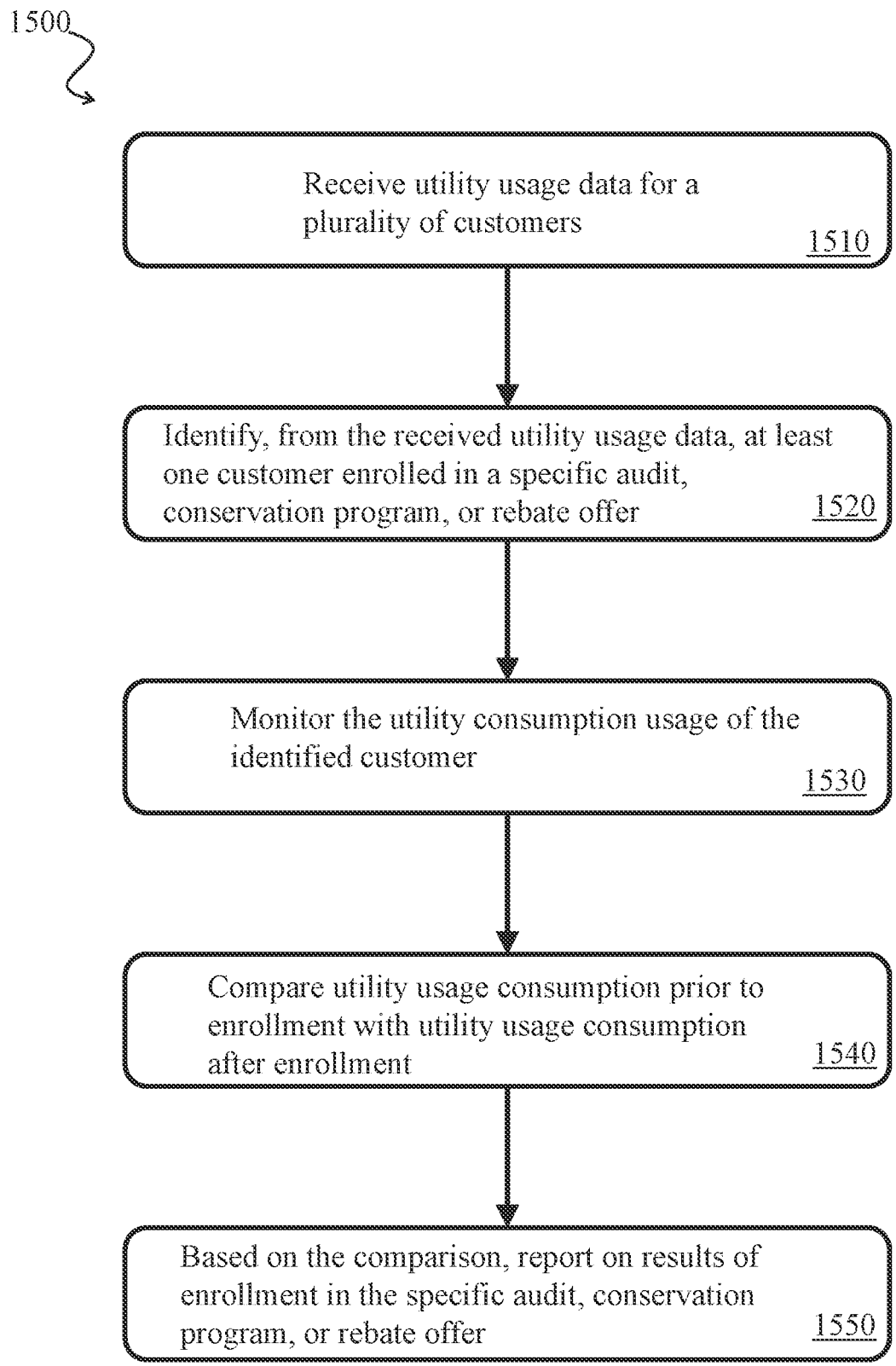
FIG. 15 is a flowchart for an exemplary method as described herein.

FIG. 15 is a flowchart for an exemplary method for a utility management and communication system to communicate the efficacy of one or more audits, conservation programs, or rebate offers of interest.

At step 1510 the system may receive, from a utility company, utility usage data for a plurality of the utility company's customers. In one embodiment the utility company may be a public utility company. In one embodiment the data received from the utility company may include personally identifiable information ("PII"), and the system may replace the PII with tokenized data and store the PII and tokenized data at a customer relations management system for subsequently targeting the plurality of customers in a secure manner.

At step 1520 the system may identify one or more of the plurality of customers as enrolled in a specific audit, conservation program, or rebate offer.

At step 1530 the system may, over a period of time after said enrollment, monitor the utility consumption usage of the one or more the plurality of customers.

At step 1540 the system may compare utility consumption usage prior to said enrollment with the monitored utility consumption usage post said enrollment.

At step 1550 the system may, based on the comparison, report on current results of enrollment in the specific, audit, conservation program, or rebate offer for the one or more of the plurality of customers. In one embodiment, a report may be sent via a customer relations management portal.

Figure 16:
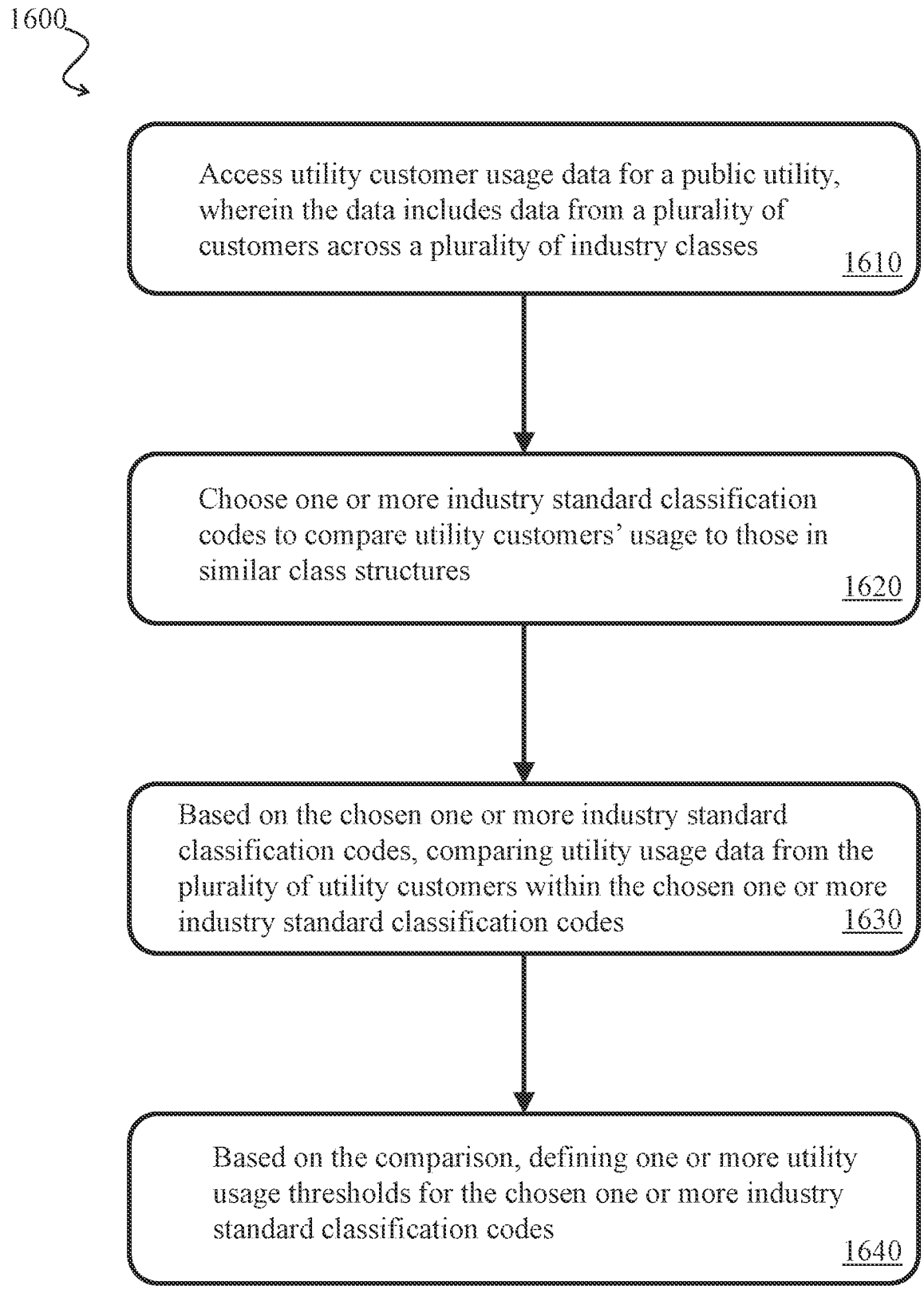
FIG. 16 is a flowchart for an exemplary method as described herein.

FIG. 16 is a flowchart for an exemplary method for a utility management system target specific types of users within a specific industry standard class, which is used to set utility usage thresholds for that industry class.

At step 1610 the system may access utility customer usage data for a public utility, wherein the utility customer usage data includes data from a plurality multitude of utility customers across a multitude plurality of industry classes. In one embodiment, the utility may be a water utility and the standard classification system may be the NAICS. In one embodiment the accessed customer usage data may include personally identifiable information ("PII"), and the system may replace the PII with tokenized data and store the PIT and tokenized data at a customer relations management system for subsequently targeting the plurality of customers in a secure manner.

At step 1620 the system may choose one or more industry standard classification codes to compare utility customers' usage to those in similar class structures.

At step 1630 the system may, based on the chosen one or more industry standard classification codes, compare utility usage data from the multitude plurality of utility customers within the chosen one or more industry standard classification codes.

At step 1640 the system may, based on the comparison, define one or more utility usage thresholds for the chosen one or more industry standard classification codes, which threshold value can be used for targeting specific user types for an audit, conservation or rebate program.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. In a utility management and communication system used to monitor customer utility usage and notify customers about their utility conservation habits, a method of identifying specific types of customers based on the need to communicate one or more audit, conservation, or rebate programs of availability, the method comprising:
   receiving, from a utility company, utility usage data for a plurality of the utility company's customers, wherein the plurality of utility customers were chosen based on a industry standard classification associated therewith;
   comparing the utility usage data for each of the plurality of customers to a resource usage threshold value, which is set based on industry standard classification for each of the plurality of utility user, which is further set based on a desired audit, conservation, or rebate program available to one or more of the plurality of customers;
   based on the comparison, identifying one or more of the plurality of customers that meet the utility usage threshold value; and
   automatically sending a message regarding the identified one or more of the plurality of customer's utility usage and the desired audit conservation, or rebate program available, wherein the message is sent to a utility administrator, the identified one or more of the plurality of customers, or both.

2. The method of claim 1, wherein the message is sent to the identified one or more of the plurality of customers via a customer relations management system.

3. The method of claim 2, wherein the customer relations management system is Salesforce.

4. The method of claim 1, wherein the utility company is a public water utility company.

5. The method of claim 1, wherein the utility usage data includes personally identifiable into nation (PII), the method further including:
   replacing the PII with tokenized data; and
   storing the PII and the tokenized data at a customer relations management system tor subsequently targeting the one or more plurality or customers in a secure manner.

6. The method of claim 1, wherein the utility is a water utility and the standard classification system is the North American Industry Classification System (NAICS).

7. In a utility management and communication system used to monitor customer utility usage, based on targeted customer types and utility usage thresholds, a method of communicating the efficacy of one or more audits, conservation programs, or rebate offers of interest, the method comprising:
   receiving, from a utility company, utility usage data for a plurality of the utility company's customers;
   identifying one or more of the plurality of customers as enrolled in a specific audit, conservation program, or rebate offer;
   over a period of time after said enrollment, monitoring the utility consumption usage of the one or more the plurality of customers; and
   comparing utility consumption usage prior to said enrollment with the monitored utility consumption usage post said enrollment and
   based on the comparison, reporting on current results of enrollment in the specific, audit, conservation program, or rebate offer for the one or more of the plurality of customers.

8. The method of claim 7, wherein the report is sent via a customer relations management portal.

9. The method of claim 7, wherein the utility company is a public utility company.

10. The method of claim 7, wherein the utility usage data includes personally identifiable information (PII), the method further including:
    replacing the PII with tokenized data; and
    storing the PII and the tokenized data at a customer relations management system for subsequently targeting the one or more users in a secure manner.

11. In a utility management system for managing utility customers' use of limited utility resources, a method of targeting specific types of users within a specific industry standard class, which is used to set utility usage thresholds for that industry class, the method comprising:
    accessing utility customer usage data for a public utility, wherein the utility customer usage data includes data from a plurality of utility customers across a plurality of industry classes;
    choosing one or more industry standard classification codes to compare utility customers' usage to those in similar class structures;

based on the chosen one or more industry standard classification codes, comparing utility usage data from the plurality of utility customers within the chosen one or more industry standard classification codes; and based on the comparison, defining one or more utility usage thresholds for the chosen one or more industry standard classification codes, which threshold value can be used for targeting specific user types for an audit, conservation or rebate program.

12. The method of claim 11 wherein the utility is a water utility and the standard classification system is the North American Industry Classification System (NAICS).

13. The method of claim 11, wherein the utility customer usage data includes personally identifiable information (PII), the method further including:

replacing the PII with tokenized data; and storing the PII and the tokenized data at a customer relations management system for subsequently targeting the plurality of users in a secure manner.

* * * * *